(12) United States Patent
Grau et al.

(10) Patent No.: US 9,541,668 B2
(45) Date of Patent: Jan. 10, 2017

(54) ENVIRONMENTAL CORRECTIONS IN NUCLEAR SPECTROSCOPY USING VARIABLE ELEMENT RATIO

(75) Inventors: James A. Grau, Marshfield, MA (US); Jeffrey Miles, Arlington, MA (US); Markus Berheide, Medford, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 99 days.

(21) Appl. No.: 14/118,868

(22) PCT Filed: May 24, 2012

(86) PCT No.: PCT/US2012/039295
§ 371 (c)(1),
(2), (4) Date: Feb. 4, 2014

(87) PCT Pub. No.: WO2012/162473
PCT Pub. Date: Nov. 29, 2012

(65) Prior Publication Data
US 2014/0138529 A1    May 22, 2014

Related U.S. Application Data

(60) Provisional application No. 61/489,287, filed on May 24, 2011.

(51) Int. Cl.
*G01V 5/10* (2006.01)
(52) U.S. Cl.
CPC .................. *G01V 5/101* (2013.01); *G01V 5/10* (2013.01)
(58) Field of Classification Search
CPC .................................. G01V 5/10; G01V 5/101
See application file for complete search history.

(56) References Cited

U.S. PATENT DOCUMENTS 3,461,291 A    8/1969  Goodman
3,546,512 A   12/1970  Frentrop
(Continued)

FOREIGN PATENT DOCUMENTS

CN      2793752 Y     7/2006
CN    101915093 A    12/2010
(Continued)

OTHER PUBLICATIONS

D.V. Ellis and J.M. Singer, "Well Logging for Earth Scientists," 2nd Edition, Springer, 2007.
(Continued)

*Primary Examiner* — Yara B Green
(74) *Attorney, Agent, or Firm* — Cameron R. Sneddon

(57) ABSTRACT

A method for estimating an aspect of a formation using a nuclear spectroscopy tool includes placing a nuclear spectroscopy tool into a borehole and emitting neutrons such that some of the neutrons generate gamma rays from a formation adjacent the nuclear spectroscopy tool and some of the neutrons generate gamma rays from elements within the nuclear spectroscopy tool. An energy spectrum of gamma rays induced by the emitted neutrons can be detected. The energy spectrum includes a background having a plurality of measured spectral components. A background ratio between at least one spectral component of the background and another measured spectral component can be determined or estimated in accordance with environmental measurements. The detected gamma ray spectra can be analyzed using a combination of standard spectra and subtracting at least one spectral component of the background in accordance with the background ratio.

15 Claims, 17 Drawing Sheets

(56) References Cited

U.S. PATENT DOCUMENTS

| | | | |
|---|---|---|---|
| 4,661,701 A | | 4/1987 | Grau |
| 5,067,090 A | | 11/1991 | Seeman |
| 5,334,833 A | * | 8/1994 | Case et al. ............... 250/269.1 |
| 5,440,118 A | | 8/1995 | Roscoe |
| 5,786,595 A | | 7/1998 | Herron et al. |
| 6,389,367 B1 | | 5/2002 | Plasek |
| 6,884,994 B2 | | 4/2005 | Simonetti et al. |
| 7,366,615 B2 | | 4/2008 | Herron et al. |
| 2007/0246649 A1 | * | 10/2007 | Jacobi .................. G01V 5/101 250/269.6 |
| 2009/0057545 A1 | * | 3/2009 | Saenger et al. ............ 250/269.4 |
| 2011/0049345 A1 | * | 3/2011 | Roberts ..................... 250/269.6 |

FOREIGN PATENT DOCUMENTS

| | | |
|---|---|---|
| CN | 201835828 U | 5/2011 |
| FR | 2790835 A1 | 9/2000 |
| GB | 2145814 A | 4/1985 |
| WO | 2010/118147 | 10/2010 |

OTHER PUBLICATIONS

X-5 Monte Carlo Team, "MCNP—A General Monte Carlo N-Particle Transport Code, Version 5," vol. II: User's Guide, LA-CP-03-0245 from Los Alamos National Laboratory, Apr. 24, 2003.

International Search Report and Written Opinion issued in the related PCT application PCT/US2012/039295 dated Nov. 27, 2012 (10 pages).

International Preliminary Report on Patentability issued in the related PCT application PCT/US2012/039295 dated Nov. 26, 2013 (6 pages).

International Search Report and Written Opinion issued in the related PCT application PCT/US2012/039301 dated Dec. 6, 2012 (10 pages).

International Preliminary Report on Patentability issued in the related PCT application PCT/US2012/039301 dated Nov. 26, 2013 (5 pages).

Office Action issued in the related China Application 201280034559.5 dated Nov. 3, 2015 (15 pages).

Office Action issued in the related Mexico Application MX/a/2013/013617 dated Dec. 4, 2014 (7 pages).

Examination Report issued in the related Saudi Arabia application 112330541 mailed on May 7, 2015 (9 pages).

International Search Report and Written Opinion issued in the related PCT application PCT/US2012/039304 dated Dec. 6, 2012 (12 pages).

International Preliminary Report on Patentability issued in the related PCT application PCT/US2012/039304 dated Nov. 26, 2013 (7 pages).

Office Action issued in the related Mexico Application MX/a/2013/013620 dated Oct. 10, 2014 (7 pages).

Office Action issued in the related Mexico Application Mx/a/2013/013620 dated Jun. 10, 2014 (8 pages).

* cited by examiner

ENVIRONMENTAL CORRECTIONS IN NUCLEAR SPECTROSCOPY USING VARIABLE ELEMENT RATIO

RELATED APPLICATIONS

This application claims the benefit of U.S. Provisional Application Ser. No. 61/489,287, entitled "SYSTEMS AND METHODS FOR ENVIRONMENTAL CORRECTIONS IN NUCLEAR SPECTROSCOPY USING VARIABLE ELEMENT RATIO" and filed on May 24, 2011, which application is incorporated by reference in its entirety.

FIELD

The disclosure pertains generally to nuclear spectroscopy and more particularly to systems and methods of estimating and accounting for environmental effects on nuclear spectroscopy results.

BACKGROUND

When drilling through a rock formation or other formations for oil, natural gas or other materials, it is beneficial to determine or estimate the type of formation that is being drilled through. For example, information regarding the formation type can be useful for more accurately interpreting other well logging measurements in order to estimate formation porosity, water saturation, net hydrocarbon content, and formation permeability and production rates. It can also be useful in making drilling decisions based on estimated mechanical properties of the formation.

There are various ways to try to determine or estimate the formation, one of which is logging while drilling or LWD. LWD is the measurement of formation properties during the excavation of the hole, or shortly thereafter, through the use of tools integrated into the bottomhole assembly.

One known technique of LWD is neutron-gamma spectroscopy, which uses neutrons to create excited states in a nucleus which then may decay via emission of one or more gamma rays. The gamma rays of each isotope have a characteristic energy spectrum which can be used to distinguish the concentration of a particular element such as hydrogen. As a result, the gamma rays of a group of isotopes provide a group of characteristic energy spectra that can be used to distinguish the concentrations of corresponding elements, such as hydrogen, chlorine, iron, silicon, calcium, sulfur, titanium, aluminum, sodium, magnesium, manganese, and nickel.

One drawback of the use of neutron-gamma spectroscopy is that one or more of elements in the spectroscopy tool can be the same as one or more elements in the formation such that the tool, when attempting to determine or estimate the elements in the formation, can actually also detect gamma rays resulting from elements in other than the formation such as elements in the tool or the drilling mud. That is, the spectrum for an element that is present in the formation and in, for example, the tool is actually the total of the spectrum of the element from the formation and the spectrum of the element from the tool. The portion of the spectrum from other than the formation is often referred to as the background spectrum.

Another drawback is that the environmental conditions of the formation can vary from well to well and also as a function of depth within a particular well, which can affect the spectra measured using LWD neutron-gamma spectroscopy. Examples of varying formation environmental parameters are borehole size, rock formation density, borehole fluid density, hydrogen index of the rock formation, neutron slowing-down length of the rock formation, thermal neutron capture cross section Sigma of the rock formation, or thermal neutron capture cross section Sigma of a borehole fluid.

Eliminating, reducing the effects of, or compensating for either of these drawbacks would be beneficial when attempting to determine or estimate the type of formation that is being drilled through.

SUMMARY

The present disclosure describes several different methods, apparatus, and systems for accounting for environmental impact on nuclear spectroscopy measurements.

In accordance with an embodiment of the present disclosure, a method for estimating an aspect of a formation using a nuclear spectroscopy tool includes placing a nuclear spectroscopy tool including a neutron source and a gamma ray detector into a borehole and performing a plurality of environmental measurements. Neutrons are emitted from the nuclear spectroscopy tool such that some of the neutrons generate gamma rays from a formation adjacent the nuclear spectroscopy tool and some of the neutrons generate gamma rays from elements within the nuclear spectroscopy tool. An energy spectrum of gamma rays induced by the emitted neutrons can be detected. The energy spectrum includes a background having a plurality of measured spectral components. A background ratio between at least one spectral component of the background and another measured spectral component can be determined or estimated in accordance with the plurality of environmental measurements. The detected gamma ray spectra can be analyzed using a combination of standard spectra and subtracting at least one spectral component of the background in accordance with the background ratio. An aspect of the formation can be estimated based on the analysis.

In accordance with an embodiment of the present disclosure, a nuclear spectroscopy tool for estimating an aspect of a formation includes a neutron source that is configured to emit neutrons such that some of the neutrons can generate gamma rays from a formation adjacent the nuclear spectroscopy tool and some of the neutrons can generate gamma rays from elements within the nuclear spectroscopy tool. The tool includes a gamma ray detector that is configured to detect an energy spectrum of gamma rays induced by the emitted neutrons, the energy spectrum including a background having a plurality of spectral components. The tool also includes data processing circuitry that estimates a background ratio between at least one the spectral components of the background and another of the spectral components in accordance with measurements made of the environment of the tool and the formation, analyzes the detected gamma ray spectrum using a combination of standard spectra and by subtracting at least one of the spectral components of the background in accordance with the background ratio, and estimates an aspect of the formation based on the analyzing of the detected gamma ray spectrum.

In accordance with an embodiment of the present disclosure, a nuclear spectroscopy system for estimating an aspect of a formation includes a neutron source configured to emit neutrons such that some of the neutrons can generate gamma rays from a formation adjacent the nuclear spectroscopy tool and some of the neutrons can generate gamma rays from elements within the nuclear spectroscopy tool. A gamma ray detector is configured to detect an energy spectrum of gamma rays induced by the emitted neutrons, the energy spectrum including a background having a plurality of spectral components. The system includes a measurement device for performing measurements of the environment of the system and the formation and data processing circuitry that estimates a background ratio between at least one of the spectral components of the background and another of the spectral components in accordance with the environment measurements, analyzes the detected gamma ray spectrum using a combination of standard spectra and by subtracting at least one spectral component of the background in accordance with the background ratio, and estimates an aspect of the formation based on the analyzing of the detected gamma ray spectrum.

Other embodiments include structure, means, apparatuses and systems that carry out the above-described methodology embodiments. Further while multiple embodiments with multiple elements or aspects are disclosed, still other embodiments, elements, and aspects of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

One or more specific embodiments of the present disclosure will be described below including method, apparatus and system embodiments. These described embodiments and their various elements are only examples of the presently disclosed techniques. The structural aspects of the disclosed apparatuses provide means for carrying out the various aspects of the disclosed methods. It should be appreciated that in the development of any such actual implementation, as in any engineering or design project, numerous implementation-specific decisions can be made to achieve the developers' specific goals, such as compliance with system-related and business-related constraints, which can vary from one implementation to another. Moreover, it should be appreciated that such a development effort might be time consuming, but would nevertheless be a routine undertaking of design, fabrication, and manufacture for those of ordinary skill having the benefit(s) of this disclosure.

When introducing elements of various embodiments of the present disclosure, the articles "a," "an," and "the" are intended to mean that there are one or more of the elements. The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the listed elements.

Figure 1:
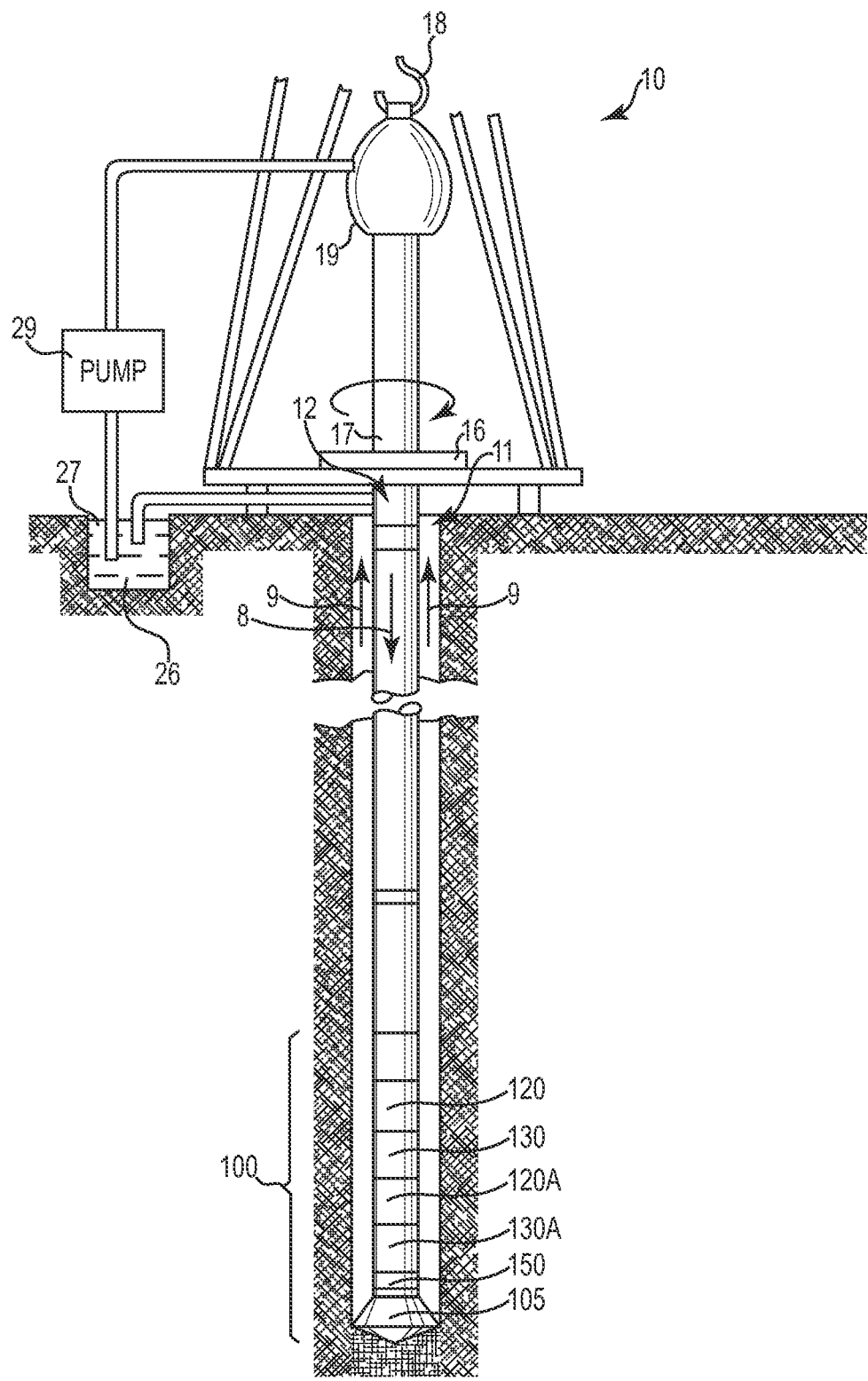
FIG. 1 is a schematic diagram of a wellsite system in accordance with an embodiment of the disclosure.

FIG. 1 illustrates an embodiment of a wellsite logging apparatus, system and methodology. The wellsite system of FIG. 1 can be onshore or offshore for, for example, exploring and producing oil, natural gas, and other resources that can be used, refined, and otherwise processed for fuel, raw materials and other purposes. In the wellsite system of FIG. 1, a borehole 11 can be formed in subsurface formations, such as rock formations, by rotary drilling using any suitable technique. A drillstring 12 can be suspended within the borehole 11 and can have a bottomhole assembly 100 that includes a drill bit 105 at its lower end. A surface system of the wellsite system of FIG. 1 can include a platform and derrick assembly 10 positioned over the borehole 11, the platform and derrick assembly 10 including a rotary table 16, kelly 17, hook 18 and rotary swivel 19. The drillstring 12 can be rotated by the rotary table 16, energized by any suitable means, which engages the kelly 17 at the upper end of the drillstring 12. The drillstring 12 can be suspended from the hook 18, attached to a traveling block (not shown), through the kelly 17 and the rotary swivel 19, which permits rotation of the drillstring 12 relative to the hook 18. A top drive system could alternatively be used, which can be a top drive system well known to those of ordinary skill in the art.

In the wellsite system of FIG. 1, the surface system can also include drilling fluid or mud 26 stored in a pit 27 formed at the well site. A pump 29 can deliver the drilling fluid 26 to the interior of the drillstring 12 via a port in the swivel 19, causing the drilling fluid to flow downwardly through the drillstring 12 as indicated by the directional arrow 8. The drilling fluid 26 can exit the drillstring 12 via ports in the drill bit 105, and circulate upwardly through the annulus region between the outside of the drillstring 12 and the wall of the borehole 11, as indicated by the directional arrows 9. In this manner, the drilling fluid 26 lubricates the drill bit 105 and carries formation cuttings up to the surface, as the fluid 26 is returned to the pit 27 for recirculation.

The bottomhole assembly 100 of the wellsite system of FIG. 1 can, as one example, include one or more of a logging-while-drilling (LWD) module 120, another type of a measuring-while-drilling (MWD) module 130, a rotosteerable system and motor 150, and the drill bit 105. The LWD module 120 can be housed in a special type of drill collar. It will also be understood that more than one LWD module or logging tool within the LWD module can be employed, as generally represented at numeral 120A. As such, references to the LWD module 120 can alternatively mean a module at the position of 120A as well. The LWD module 120 can include capabilities for measuring, processing, and storing information, as well as for communicating with surface equipment.

Figure 2:
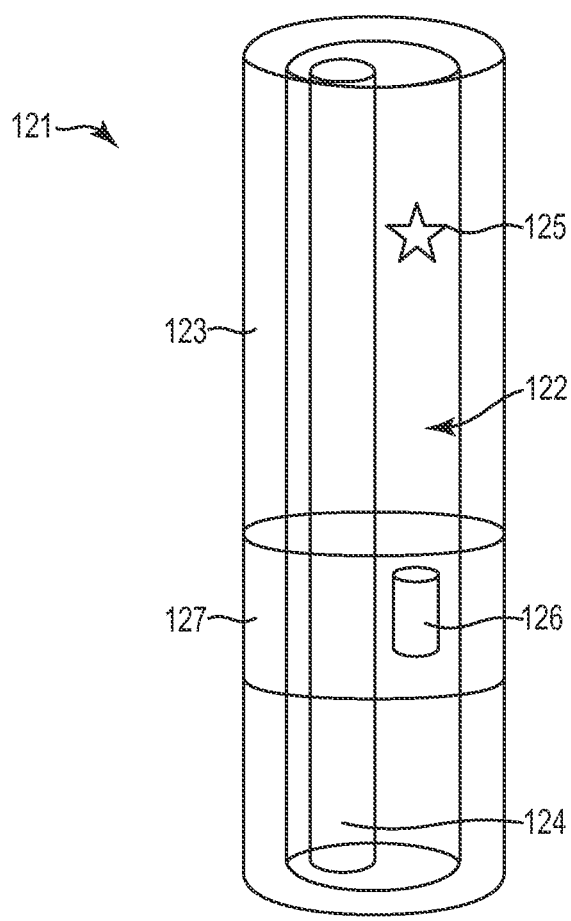
FIG. 2 is a schematic illustration of a logging-while-drilling spectroscopy tool in accordance with an embodiment of the disclosure.

FIG. 2 presents a schematic block diagram side view of an illustrative embodiment of a LWD module, being or including a spectroscopic logging tool 121. The logging tool 121 includes a chassis 122, a collar 123 and a flow tube 124 that extends through the logging tool 121. A neutron source 125 is located at a first location within the logging tool 121 and a detector 126, such as a gamma ray detector, is located at a second location axially spaced from the neutron source 125. A neutron shield such as a boron shield 127 is radially disposed about the logging tool 125 at or near the second location. Specifics regarding this embodiment and other embodiments of spectroscopic tools employing the general configuration or aspects of the LWD module 120 and logging tool 122 are envisaged for use with any suitable means of conveyance, such as wireline, coiled tubing, logging while drilling (LWD), and so forth. Further, information regarding the environment, such as the sigma of the formation, sigma of the mud, density, borehole size, and slowdown length, can be gained using additional equipment as further discussed below.

Figure 3:
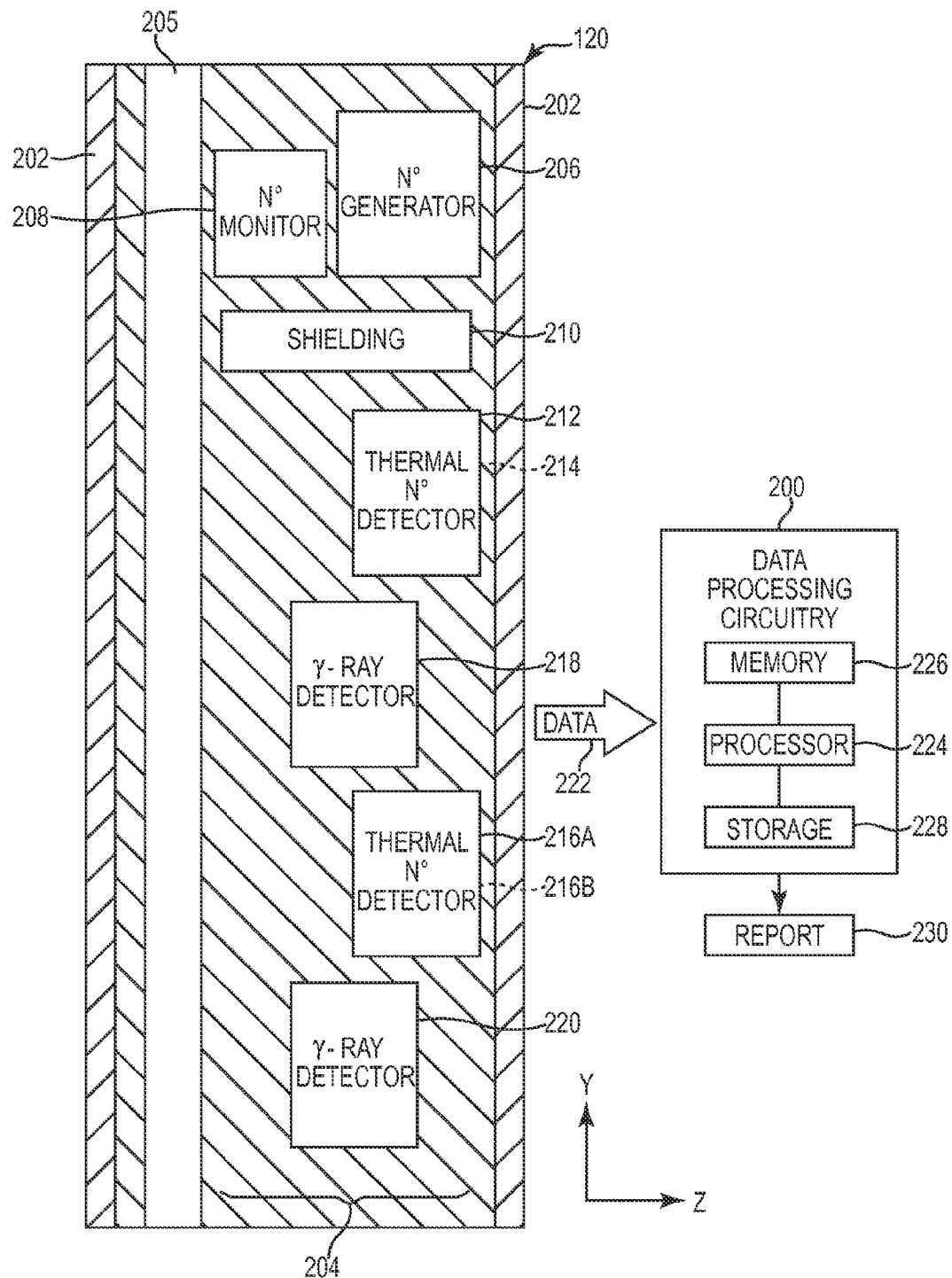
FIGS. 3 and 4 are schematic block diagrams in accordance with an embodiment of the disclosure.
Figure 4:
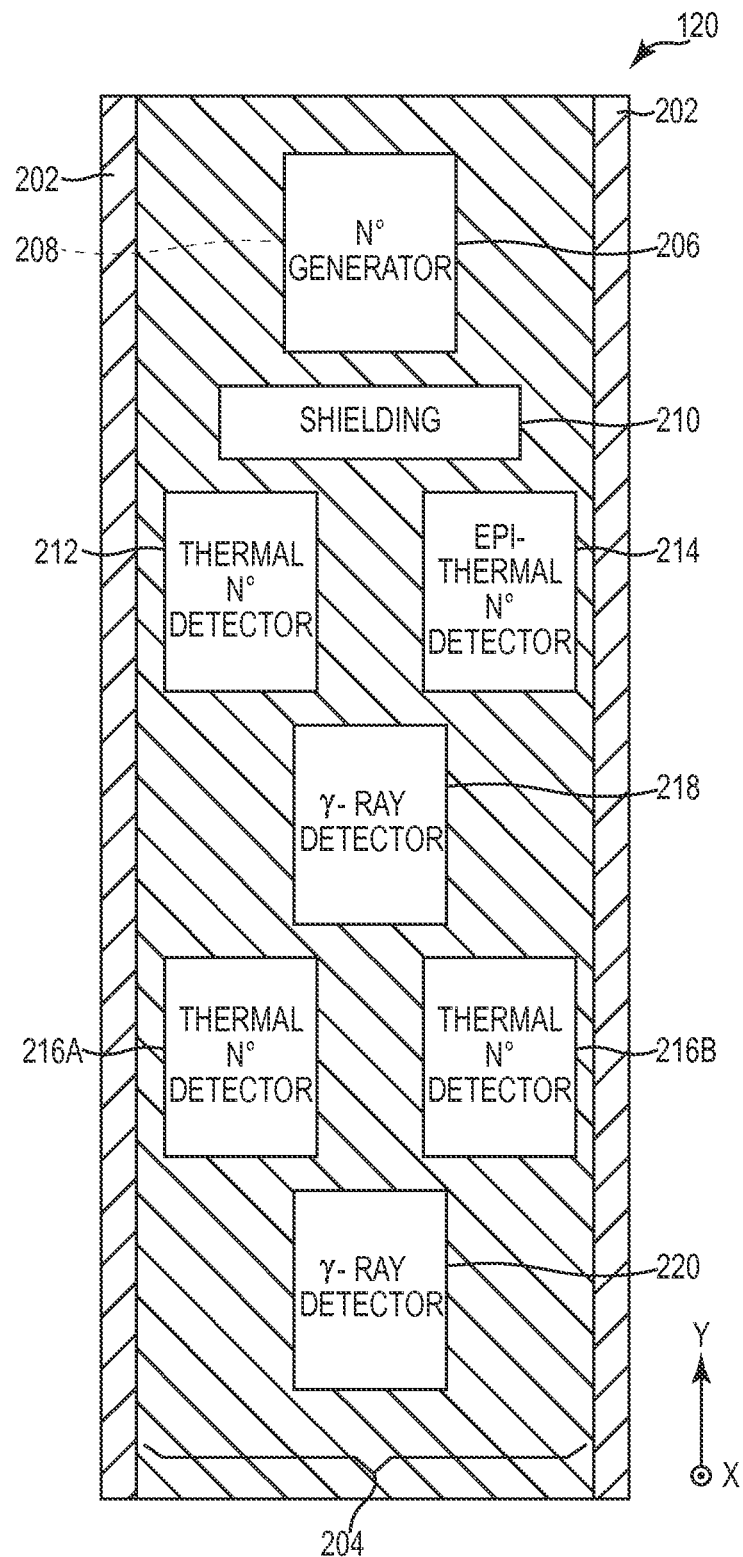

FIGS. 3 and 4 present schematic block diagram side views of an embodiment of a LWD module 120, with these Figures respectively rotated by 90 degrees from one another. The LWD module 120 can be associated with data processing circuitry 200. Although the LWD module 120 and the data processing circuitry 200 are depicted as independent elements in FIG. 2, one can appreciate that the data processing circuitry 200 can be implemented entirely within the LWD module 120, at the surface remote from the LWD module 120, or partially within the LWD module 120 and partially at the surface. By way of example, the LWD module 120 can represent a model of the EcoScope™ tool by Schlumberger Technology Corporation.

The chassis 204 of this embodiment of the LWD module 120 can include a variety of components and configurations for emitting and detecting radiation to obtain a spectroscopy measurement. For example, a neutron source 206 can serve as a neutron source that emits neutrons of at least 2 MeV to create gamma rays through inelastic scattering with formation elements. By way of example, the neutron source 206 can be an electronic neutron source, such as a Minitron™ device commercially available from Schlumberger Technology Corporation, which can produce pulses of neutrons through deuteron-deuteron (d-D), deuteron-triton (d-T), triton-triton (t-T) or other suitable reactions. Thus, the neutron source 206 can emit neutrons around 2 MeV or 14 MeV, for example, or neutrons with a broad range of energies such as those obtained from continuous sources of neutrons such as $^{241}$AmBe or $^{252}$Cf radioisotope sources.

In some embodiments, a spectroscopy tool can include a neutron monitor 208 that can be configured to monitor the neutron emissions from the neutron source 206. By way of example, the neutron monitor 208 can be a plastic scintillator and photomultiplier that primarily detects unscattered neutrons directly emitted from the neutron source 206, and thus can provide a count rate signal proportional to the neutron output rate from the rate of neutron output of the neutron source 206. Illustrative but non-limiting examples of suitable neutron monitors are described in U.S. Pat. No. 6,884,994, which patent is incorporated by reference herein.

Neutron shielding 210, which can include tungsten, lead or boron, for example, can provide means to largely prevent neutrons from the neutron generator 206 from passing internally through the LWD module 120 toward various radiation-detecting components on the other side of the shielding 210. Suitable tungsten shielding material is available commercially from PLANSEE USA LLC of 115 Constitution Boulevard, Franklin Mass. 020038. Suitable boron shielding can be obtained from a variety of sources and can include boron in several different forms such as metallic boron, $B_4C$, BN and others. In some embodiments, boron enriched with a $^{10}$B isotope is used and is commercially available from Ceradyne, P.O. Box 798, Quapaw Okla. 74363.

As illustrated in FIGS. 3 and 4, the LWD module 120 can include two near or collocated neutron detectors, such as a thermal neutron detector 212 and an epithermal neutron detector 214. Two far thermal neutron detectors 216A and 216B can also be included and can be located at a spacing farther from the neutron generator 206 than the neutron detectors 212 and 214. For example, the near neutron detectors 212 and 214 can be spaced approximately 10-14 in. from the neutron generator 206, and the far neutron detectors 216A and 216B can be spaced 18-28 in. from the neutron generator 206. Neutron detectors are commercially available from GE Reuter Stokes of Twinsburg Ohio and Schlumberger Technology Corporation of Houston, Tex.

A short spacing (SS) gamma ray detector 218, such as a detector using NaI, LaBr, or GSO, can be located between the near neutron detectors 212 and 214 and the far neutron detectors 216A and 216B. A long spacing (LS) gamma ray detector 220 can be located beyond the far neutron detectors 216A and 216B, at a spacing farther from the neutron generator 206 than the gamma ray detector 218. For example, the SS gamma ray detectors 218 can be spaced approximately 10-22 in. from the neutron generator 206, and the LS gamma ray detector 220 can be spaced approximately 24-38 in. from the neutron generator 206. Gamma ray detectors are commercially available from Saint-Gobain Crystals of 17900 Great Lakes Parkway, Hiram Ohio 44234-9681. Alternative embodiments of the LWD module 120 can include more or fewer of such radiation detectors, but generally can include at least one gamma ray detector. The neutron detectors 212, 214, 216A, and/or 216B can be any suitable neutron detectors, such as $^3$He neutron detectors. To detect primarily epithermal neutrons, the epithermal neutron detector 214 can be surrounded by thermal neutron shielding, while the thermal neutron detectors 212, 216A, and/or 216B are not.

The gamma ray detectors 218 and/or 220 can be scintillation detectors surrounded by neutron shielding. The neutron shielding can include, for example, $^6$Li, such as lithium carbonate ($Li_2CO_3$), which can substantially shield the gamma ray detectors 218 and/or 220 from thermal neutrons without producing thermal neutron capture gamma rays. The gamma ray detectors 218 and 220 can detect inelastic gamma rays generated when fast neutrons from the neutron generator 206 inelastically scatter off certain elements of a surrounding formation.

The count rates and energy spectra of gamma rays from the gamma ray detectors 218 and 220 and count rates of neutrons from the neutron detectors 212, 214, 216A, and/or 216B can be received by the data processing circuitry 200 as data 222. The data processing circuitry 200, which can be part of other noted components or structure or separate components or structure, provides means for receiving the data 222 and performing certain steps or processing to determine or estimate one or more properties of the surrounding formation, such as formation mineralogy and other properties disclosed herein. The data processing circuitry 200 can include a processor 224, algorithms (steps or instructions to carry out steps to accomplish the disclosed objectives; not shown), memory 226, and/or storage 228. The processor 224 can be operably coupled to the memory 226 and/or the storage 228 and to carry out the presently disclosed steps or algorithms. Techniques disclosed herein can be carried out by the processor 224 and/or other data processing circuitry based on corresponding instructions executable by the processor 224. Such instructions can be stored using any suitable article of manufacture, which can include one or more tangible, computer-readable media to at least collectively store these instructions. The article of manufacture can include, for example, the memory 226 and/or the nonvolatile storage 228. The memory 226 and the nonvolatile storage 228 can include any suitable articles of manufacture for storing data and executable instructions, such as random-access memory, read-only memory, rewriteable flash memory, hard drives, and optical disks. The memory 226 and storage 228 are collectively referred to herein as data storage. One example of a processor is the processor within the Digital Equipment Corporation PDP-11 computer, which is described in U.S. Pat. No. 5,067,090. Other processors can be those used in general purpose computers that use Windows XP, Windows Vista, and Windows 7 in particular for processing at the surface. A specific example of a processor suitable for use in a drilling tool is a 32-bit floating point processor such as the Texas Instruments TMS320VC33 DSP.

The LWD module 120 can transmit the data 222 to the data processing circuitry 200 via, for example, internal connections within the tool, a telemetry system communication uplink, and/or a communication cable. The data processing circuitry 200 can determine or estimate one or more properties of the surrounding formation. By way of example, such properties can include the relative spectral yields of the capture gamma rays of elements or the elemental concentrations of the formation. Thereafter, the data processing circuitry 200 can output information or a report 230 indicating the spectroscopy measurement of the formation. The report 230 can be stored in memory or storage for later further processing by the circuitry 200 or by other circuitry, or can be provided to an operator via one or more output devices, such as an electronic display.

In neutron-capture spectroscopy, energetic neutrons are emitted into the volume surrounding a tool, where they lose energy and achieve thermal equilibrium with the environment. After some time, these "thermal" neutrons are captured by nuclei, causing them to become excited and to emit gamma rays with characteristic energy spectra. The capturing elements can be located in the formation rock, the formation pore space, the borehole fluids, or in the tool itself. The characteristic gamma-ray spectrum associated with each element can be recognized, and the total measured energy spectrum is analyzed to derive the relative contribution of each element. Often, but not always, the elements of interest are those located in the formation. The spectral yields from elements such as Si, Ca, Fe, S, Ti, Gd, Mg, Al, K, and Na are grouped together and analyzed collectively under the assumption that they are part of a limited set of minerals common to oil reservoirs to determine or estimate the rock lithology in which the tool is immersed. The set of assumptions are known in the art as a closure model (e.g. WALK closure) and the standard closure model can be modified for certain locations. The accuracy of the neutron-capture spectroscopy determinations or estimations relates to the difference between the actual elemental composition of the formation (that is, the presence of the various elements that make up the formation and the percentage contribution of each element) and the elemental composition of the formation derived from the measurements from the spectroscopy tool.

In some embodiments, background yields can result from one or more of these elements also being found within the spectroscopy tool. As such, the accuracy of the spectroscopy measurements of the elements in the formation can involve the determination or estimation of the background yields of the common elements and the subtraction of those background yields.

A source of background is the iron yield from within the tool itself, which can be subtracted from the total iron to derive the rock matrix iron. Subtraction of background iron can involve the total tool background being grouped into two standard spectra: the iron standard, which encompasses contributions from both the tool and the rock matrix; and a so-called "tool background" standard which accounts for the other elements in the tool except iron. This assumes that the ratio of iron to the sum of the other elements in the tool is constant. Because these other elements do not generally appear in the downhole environment, the latter standard is the main indicator of the overall background level.

In some embodiments, the environment surrounding the tool can affect the size and shape of the cloud of neutrons, and can alter what fraction of neutrons are thermalized within the tool itself, the rock formation outside of the tool, the drilling mud and the like. Environmental conditions of the formation can vary from well to well and also as a function of depth within a particular well. Examples of varying formation environmental parameters include but are not limited to borehole size, formation density, borehole fluid density, hydrogen index of the rock formation, neutron slowing-down length of the formation, thermal neutron capture cross section Sigma of the formation, or thermal neutron capture cross section Sigma of a borehole fluid. The present disclosure describes several different methods and apparatuses for accounting for environmental impact on nuclear spectroscopy measurements, as well as for the presence of one or more elements in both the formation and the tool (and/or drilling mud or other materials than the formation).

Variable Algorithm for Background Subtraction

The accuracy of the spectroscopy measurement or estimation of the formation is increased in part by improving the accuracy of the subtraction of background yields. One source of background is the iron yield from within embodiments of the tool itself. In some embodiments, LWD tools or modules, such as those previously mentioned, include a large amount of iron (i.e., being made of steel). Similarly, some wireline (WL) tools also include a large amount of iron (i.e., again being made of steel). In some embodiments, an accurate measurement or estimation of matrix iron is useful because some algorithms for determining or estimating clay volume are driven by the amount of iron in the rock matrix. Examples of an algorithm or methodology for determining or estimating clay volume are described in U.S. Pat. No. 5,786,595. In some embodiments, measuring or estimating the formation iron matrix includes subtracting the tool background from the total iron yield in the spectrum.

A method for subtracting background iron can involve first logging spectroscopy data regarding the formation with the spectroscopy tool (such as those previously described), then subtracting the tool background by using a total tool background having two standards (characteristic gamma-ray spectra). The two standards can include an iron standard, which encompasses contributions from both the tool and the rock matrix; and the so-called "tool background" standard, which accounts for the other elements in the tool except iron. These other elements within the tool can include chromium, nickel, manganese, tungsten, elements from within the detector crystal, and other trace contributions. Because these other elements do not generally appear in the typical downhole environment outside the tool, a constant ratio between the gamma-ray yield from the iron and the sum of yields from the other tool elements can be used to represent an overall background level, which varies with environmental conditions.

The tool background iron yield can be inferred from the relation $$Fe^{tool}/TB = k,$$

where TB denotes the yield of the "tool background" standard and k can be a constant determined or estimated by experiment. Such an experiment can be performed in a typical logging environment, which can result in the value of k for a spectroscopic logging tool being, for example, 0.55. However, this value can be less accurate if changes in the environment cause the tool background yield to be composed of a different mix of elements than what is expected. In that case, the true iron ratio becomes some value other than k, and the inferred or estimated matrix iron measurement (and derived clay estimate) is less accurate.

In some instances, the logging environment affects the spatial distribution of thermal neutrons around and inside the logging tool. In some cases, and as a result, the spectra of the elemental composition of the tool background can be sampled differently depending on where neutrons are located within the tool.

The variable location of the capturing nuclei can, for previously noted reasons, also affect the degree of attenuation undergone by the emitted gamma rays. The combined result is that the ratio between the gamma-ray yield from background iron and the yield from other tool background elements can deviate from a constant value k, and the subtracted amount of background iron is less accurate. The present disclosure provides a more accurate value of k for a given environment, so that the amount of iron in the rock matrix is derived more accurately than the current state of the art.

In some embodiments, the issue of a variable background iron ratio can be addressed by parameterizing the iron ratio as a function of environmental conditions that are determined or estimated from other measurements that can be performed in the tool string. In some embodiments, the form and coefficients of the function can be derived empirically from spectroscopy logging data, from Monte Carlo modeling or from other modeling approaches. In some embodiments, these two approaches can be combined in a hybrid approach, for example, the use of Monte Carlo simulation can provide sensitivity to environmental properties that are otherwise difficult to infer from log data alone. Illustrative examples of Monte Carlo modeling suitable for use in the methods described herein can be found in Ellis and Singer, "Well Logging for Earth Scientists," $2^{nd}$ Edition (Singer, 2007). A description of these methods and the corresponding equipment and systems for carrying out the methods is included in the section below.

Adaptive Iron Ratio Derived from Monte Carlo Modeling

In some embodiments, Monte Carlo modeling can be used to simulate the neutron-capture spectroscopy measurement and extract the dependence of the background iron ratio on various environmental parameters. The modeling can be performed with the MCNP5 code and custom software (for example, in Matlab) that analyzes the PTRAC output from MCNP. The MCNP code can also be modified directly to extract the desired information. The MCNP5 code is described, for example, in *A General Monte Carlo N-Particle Transport Code, Version* 5, LA-CP-03-0245 from Los Alamos National Laboratory (2003).

Available information from the Monte Carlo simulation includes the spatial location and time of the neutron capture, the isotope and material on which it was captured, the statistical weight and energy of the gamma ray at its creation, and the statistical weight and energy of the gamma ray incident on the detector. The final quantity of interest produced by the model for this work is the full set of elemental yields measured by the detector, integrated over the appropriate range of energy channels and timing gates.

In some embodiments, the Monte Carlo model can be used to produce a database of the predicted iron ratio $Fe^{tool}/TB$ for a realistic range of logging environments. A functional parameterization of the ratio is extracted through analysis of the variation of these data points with respect to useful environmental parameters. In this embodiment, the variable environmental parameters include the thermal neutron capture cross-section Sigma of the formation ($\Sigma_f$), the formation slowing-down length ($L_s$) (which is a parameter that is used to characterize neutron interactions above the thermal region) or hydrogen index (HI), the formation density ($\rho_b$), the diameter of the borehole ($D_{BH}$) and the Sigma value of the drilling mud ($\Sigma_m$). In some embodiments, a complete database can have over 1000 points. Other environmental dependences are also possible.

The formation slowing down length $L_s$ can be determined or estimated in a variety of ways. If a radioisotope neutron source is used, at least one neutron detector or one gamma-ray detector can be used to measure $L_s$. Alternatively, thermal or epithermal detectors at a different axial spacing (near and far detectors) can be used to determine or estimate $L_s$ (or hydrogen index) from the ratio of near/far count rates. In yet another approach the count rate ratio between near and far gamma-ray detectors can be used or a ratio between neutron and gamma-ray count rates. If the neutron source is an electronic source (continuous or pulsed) in addition to the detectors above, a neutron monitor can be used to determine or estimate the neutron output of the source.

The borehole size can either be assumed to be the size of the hole drilled by a drill bit with a given diameter or alternatively and more accurately it can be obtained from a borehole size measurement, which can be obtained by a direct mechanical caliper measurement (used for wireline tools) or measurements like an ultrasonic caliper, density caliper, etc. which are suited for a borehole size measurement in particular in LWD/MWD. The formation density can be obtained by a traditional gamma-gamma formation density measurement, neutron-gamma density (NGD), acoustic density, and many others. Porosity and/or hydrogen index can be derived from the density measurement (if the matrix density and the formation fluid density are known) or from a neutron porosity measurement. The measurement of the formation and borehole macroscopic neutron capture cross section (Sigma) is known in the industry and is obtained by measuring the die-away of neutron induced (capture) gamma rays or the die-away of a neutron population. Borehole sigma is obtained in the same way. This can be accomplished with tools like the Schlumberger Thermal Decay Time, Reservoir Saturation Tool, and Accelerator Porosity Sonde in wireline applications and with the Schlumberger EcoScope™ tool in logging while drilling applications.

The functional dependence of $Fe^{tool}/TB$ on each environmental parameter can be assigned through visual inspection of the data, or a statistical approach such as response surface methodology can be applied. For example, and as noted above, in some situations, a strong variation of the iron ratio occurs due to formation Sigma, with large Sigma values causing a decrease in $Fe^{tool}/TB$; through visual inspection, this dependence can be modeled by a decreasing exponential or a linear function. Addition terms can be added to account for other environmental dependences. A viable function for the iron ratio in an illustrative spectroscopic logging-while-drilling tool has the form $$k\left(\sum\nolimits_f, L_s, \rho_b, D_{BH}, \sum\nolimits_m\right) =$$
$$c_1 + c_2 \cdot \exp(-c_4 \cdot (D_{BH} - C_1)) \cdot \left(1 - \exp\left(-c_3 \cdot \left(\sum\nolimits_f - C_2\right)\right)\right) +$$
$$c_6 \cdot \exp(-c_5 \cdot (D_{BH} - C_3)) \cdot \left(\sum\nolimits_m - C_4\right) + c_7 \cdot (L_s - c_8)^2 + c_9 \cdot (\rho_b - C_5),$$

where the independent variables are the five environmental properties noted above, respectively, the coefficients $c_1, c_2, c_3, c_4, c_5, c_6, c_7, c_8$ and $c_9$ are free parameters that can be determined or estimated simultaneously in a least-squares fit and the coefficients $C_1, C_2, C_3, C_4$ and $C_5$ are parameters specific to the illustrative spectroscopic tool.

Figure 5:
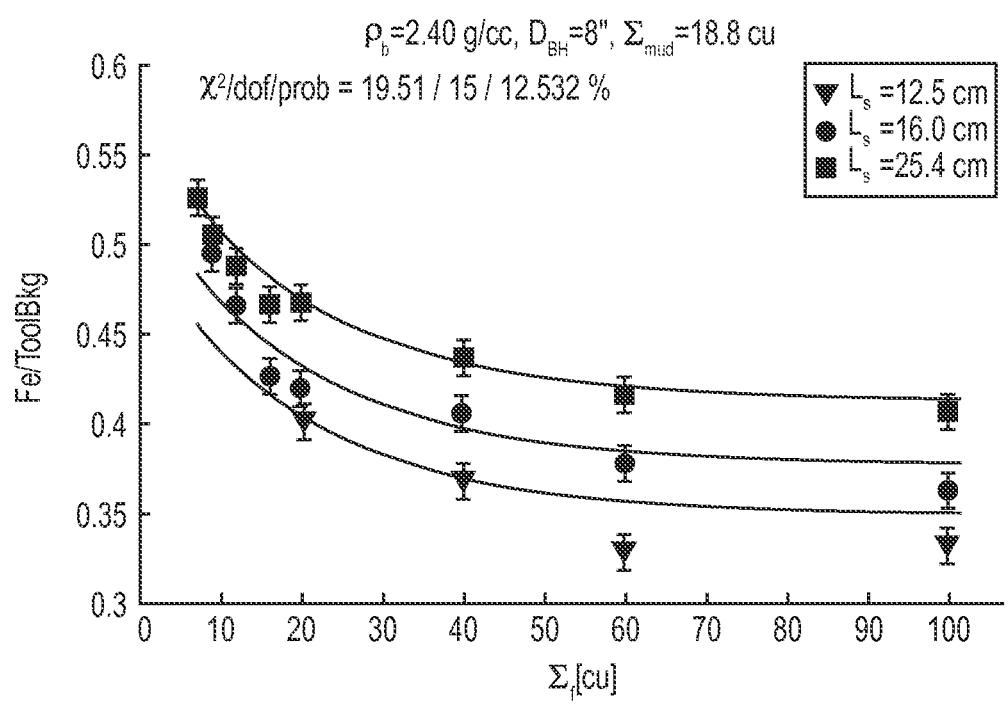
FIG. 5 is a plot illustrating the dependence of tool background iron ratio on formation Sigma.
Figure 6:
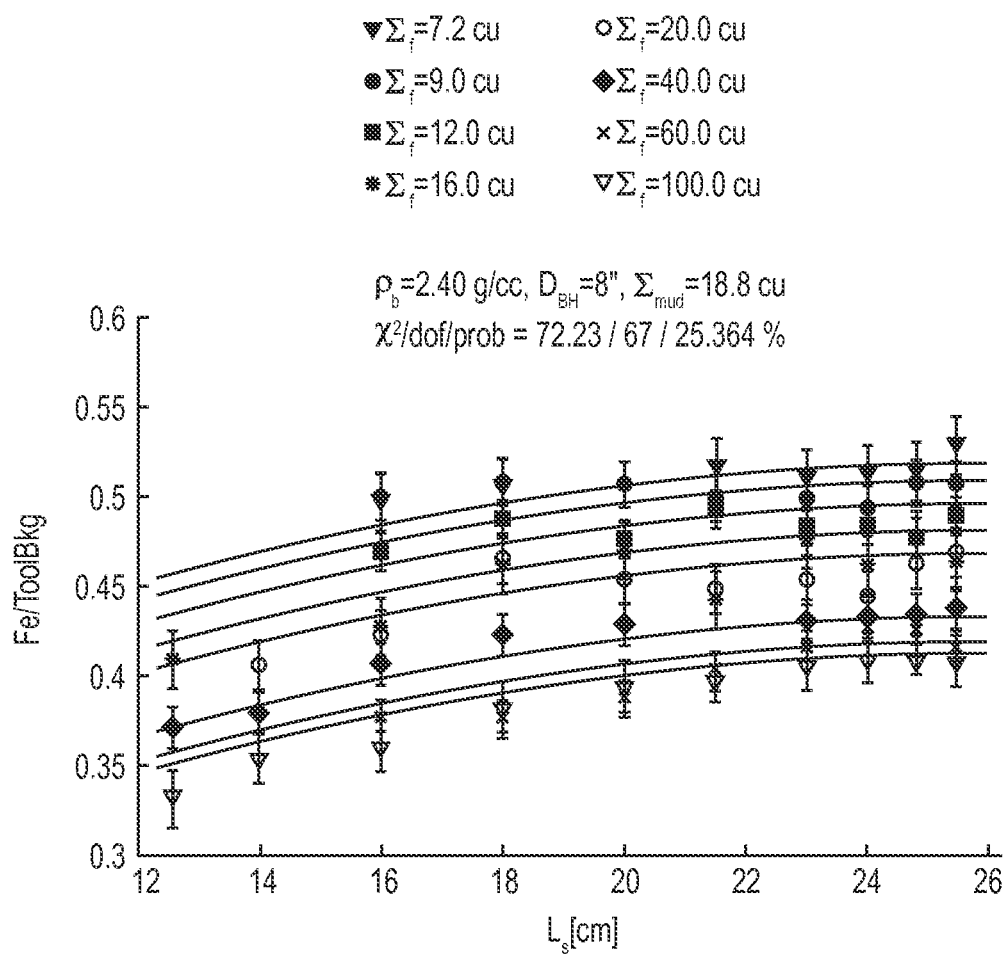
FIG. 6 is a plot illustrating the dependence of tool background iron ratio on formation slowing-down length.
Figure 7:
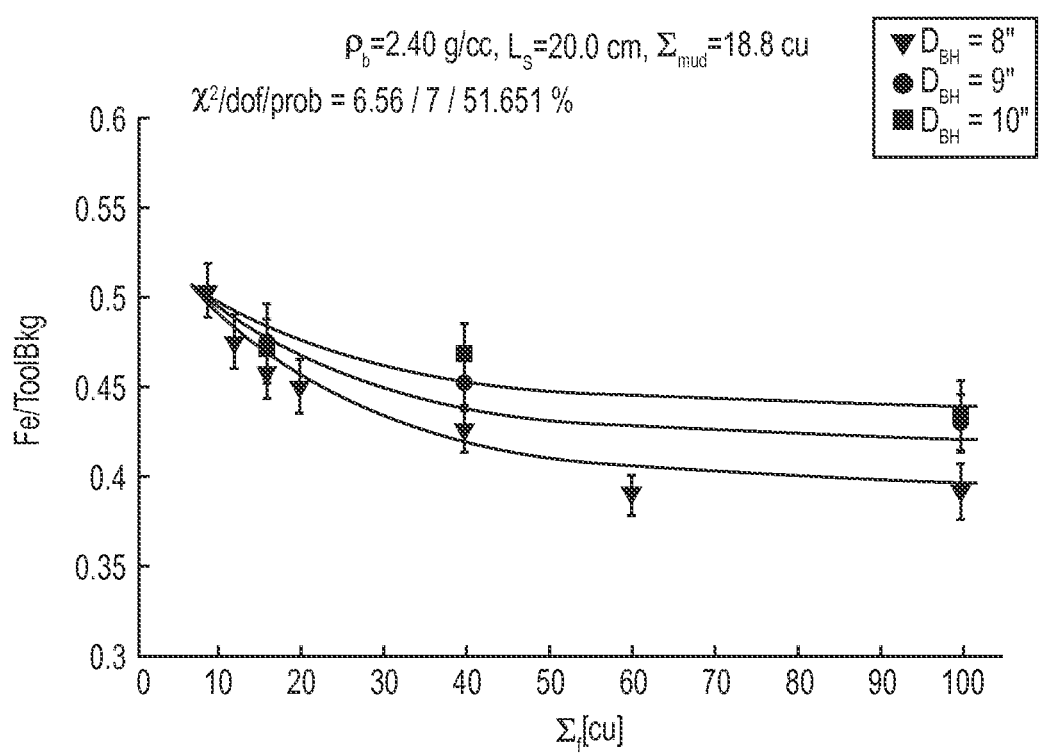
FIG. 7 is a plot illustrating how borehole size moderates the dependence of tool background iron ratio on formation Sigma.

FIG. 5 shows an example of the fitted dependence on formation Sigma, with other environmental properties held constant. FIG. 6 shows the same parameterization with respect to slowing-down length, and FIG. 7 illustrates how borehole size moderates the strength of the dependence on Sigma. Each of these figures shows a subset of the total fitted database, and each curve represents a one-dimensional projection of the function given above.

Each of the terms in the exponential function given above can be interpreted in light of the neutron-transport physics that underlies the measurement. For example, as formation Sigma increases, the population of thermal neutrons in the formation is captured more quickly, which decreases the rate at which they diffuse into portions of the spectroscopic logging tool. The decrease in inward-diffusing neutrons from the formation causes an overall drop in the measured $Fe^{tool}/TB$ ratio. This behavior is consistent with what is shown in FIG. 5 and is observed in experiments. Variation of the slowing-down length causes similar changes in the spatial distribution of thermal neutrons, except with the opposite effect because a large $L_s$ allows more neutrons into the collar near the detector.

The resulting function is an environmentally dependent parameterization of the tool background iron ratio, and it can be substituted for the constant k to perform a more accurate background subtraction than is currently available. In some embodiments using an integrated spectroscopic logging tool, measurements of the environment can be used to perform the adaptive subtraction in real-time. Alternatively, answers can be derived in real-time relying upon a constant ratio k, while corrections for environmental variation are done with post-processing.

The use of Monte Carlo modeling has advantages over experimental or data-driven approaches to correcting for an element such as iron. While Monte Carlo simulation is a statistical technique, Monte Carlo simulation can have high statistical precision and is not faced with experimental noise. The simulated data therefore have sensitivity to environmental parameters whose effects are too small to be extracted from log data alone, but which are nevertheless present in the real measurements. Another advantage of modeling is the ability to vary each environmental property of interest independently, without inducing the correlated variation of other parameters.

For example, in a real formation, varying the porosity, slowing-down length or hydrogen index can be difficult without simultaneously affecting the density and Sigma of the formation. By contrast, a Monte Carlo simulation provides arbitrary control over cross sections and material composition, such that an artificial formation can be designed in which one property is varied while other properties are held constant. This approach is used above. This ability is valuable because it makes it possible to explore the individual effects of any aspect of the environment.

Adaptive Iron Ratio Derived Empirically from Log Data

Another method of deriving a variable iron ratio is an empirical approach, in which log data for the tool of interest is compared to independent data. To derive a function of sufficient generality, these parallel datasets should cover the realistic range of environmental variation and relevant environmental measurements should be available. The general idea is that an environmentally dependent function with one or more unknown coefficients can be provided for the iron ratio, and those coefficients are adjusted in an iterative process until the rock matrix data from the tool of interest most closely matches the independent, target dataset. The adjustment of the coefficients can be performed either manually or automatically by a fitting routine. After each iteration, the new value of the iron ratio for each measurement point can be used to recalculate the rock matrix data.

As a concrete example, the empirical method is possible for open-hole wells in which data for different types of spectroscopic logging tools are available. Tools with a simpler material composition and a simpler construction can provide fewer difficulties of background subtraction. Although elemental yields are not directly comparable between two different tool designs, it is possible to compare the final derivations of weight concentration, and specifically for the rock matrix iron. Data for a simpler logging tool such as a wireline tool is processed, with its matrix yields being passed through a closure model (such as WALK2, although not necessarily) to produce dry-weight elemental concentrations that represent the target data. In parallel to these data are datasets from a logging-while-drilling spectroscopy tool, which include elemental yields from spectroscopy and numerous measurements of the environment. These comparisons are available for several wells, covering a wide-range of the relevant environmental conditions and totaling over 10,000 feet. Instead of applying the constant iron ratio k, a function of one or more environmental measurements can be substituted.

Figure 8:
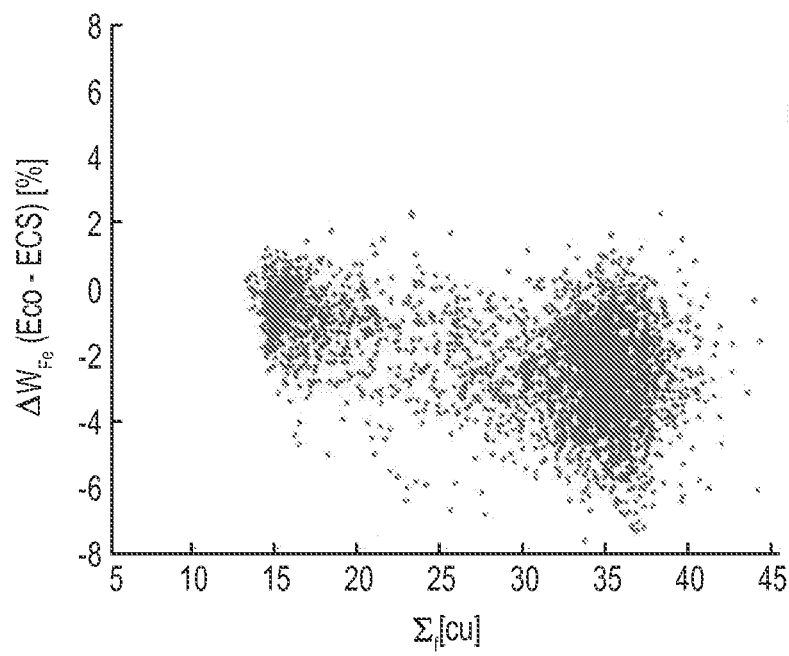
FIG. 8 is a plot illustrating a discrepancy in formation matrix iron weight concentrations.
Figure 9:
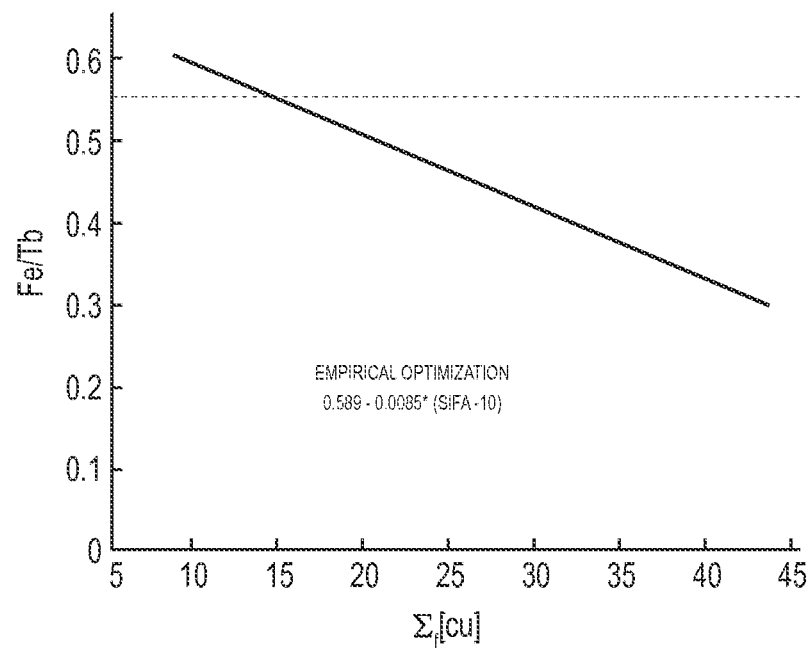
FIG. 9 is a plot illustrating a parameterization of a background iron ratio.
Figure 10A:
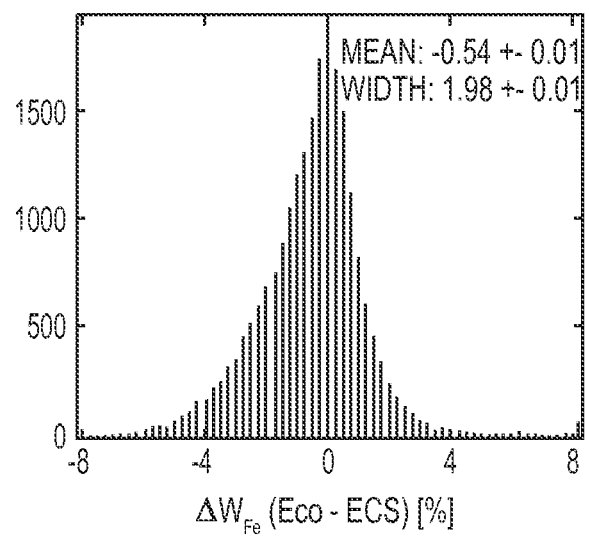
FIGS. 10A and 10B are histograms illustrating formation matrix iron weight concentrations.
Figure 10B:
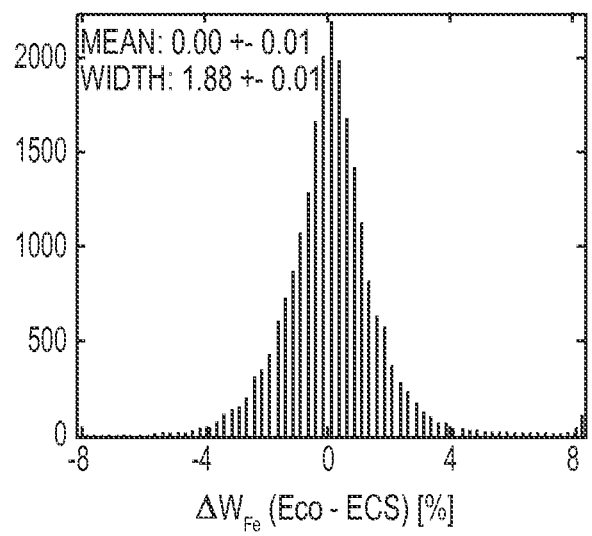

FIG. 8 is an example of the difference between the matrix iron weight concentrations produced by a wireline tool and a logging-while-drilling tool with the nominal background subtraction, illustrating its dependence on the formation Sigma. A linear function of formation Sigma is a viable choice for the empirical data:

$$k(\Sigma_f) = a_1 + a_2 \cdot (\Sigma_f - C_6),$$

where the coefficient $a_1$ represents the iron ratio that results in the best agreement between the two tools for a particular value of Sigma, $a_2$ is a negative slope that describes how the iron-to-tool background ratio can be corrected for formation sigma and $C_6$ is a tool-specific parameter. The unknown coefficients of the new $Fe^{tool}/TB$ parameterization are systematically varied by an automated routine, and at each iteration the logging-while-drilling tool yields at each depth are reprocessed with the new background subtraction equation and passed through the closure model. The new logging-while-drilling tool weight concentration for matrix iron at each depth is compared to the associated iron concentration from the wireline tool. The coefficients are varied so as to make the difference between the two iron concentrations as low as possible, averaged over the entire multi-well dataset. FIG. 9 shows the linear dependence on azimuthally averaged formation Sigma ($\Sigma_f$) in this example. Additional environmental dependences can be added, but for this dataset the use of SIFA alone already produces an improvement in agreement between the two spectroscopy tools. FIGS. 10A and 10B illustrate an overall improvement in the comparison, showing histograms of the collective iron comparison, before and after application of the environmentally adaptive correction.

It should be noted that a single-well optimization is also possible and is easier to produce, although in some embodiments a multi-well solution is more general. The quantity of comparison between the two datasets can also be expanded beyond iron to include other elemental concentrations, although the rock matrix iron comparison is the simplest and most direct for optimization of the background iron ratio. In some embodiments, core data, if available, can be used as the independent data instead of logging data.

Adaptive Iron Ratio Derived from Both Modeling and Log Data

Figure 11A:
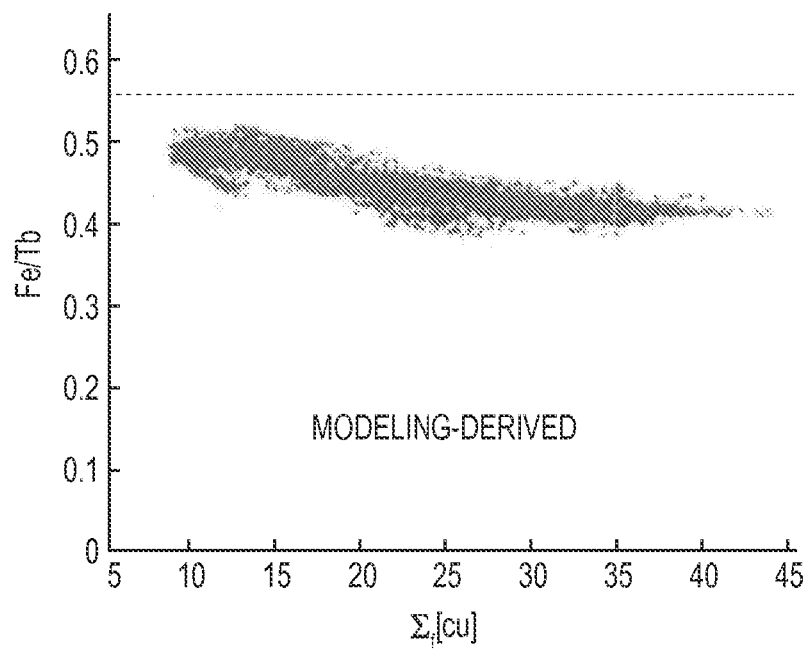
FIGS. 11A and 11B are plots illustrating a parameterized iron ratio in log data with respect to formation Sigma.
Figure 11B:
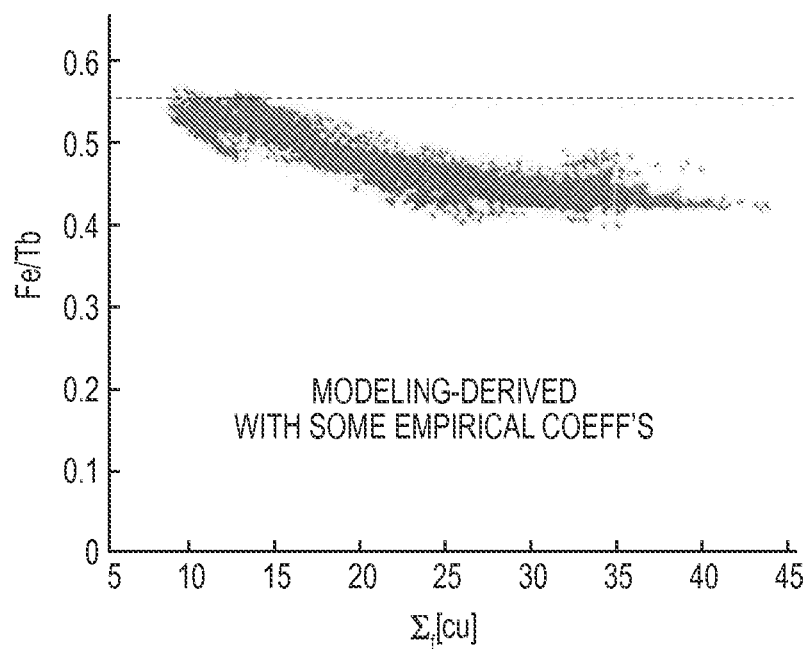

In some embodiments, another method of deriving a variable iron ratio is a hybrid one, in which an environmental parameterization for $Fe^{tool}/TB$ is developed through Monte Carlo modeling and then optimized or tuned with log data. For example, the exponential function described above can be applied in the empirical procedure described above, where some or all of the coefficients are varied to match the target data. A straightforward application of this method is to empirically optimize one or more of the coefficients while remaining coefficients can retain the values already determined or estimated via Monte Carlo modeling, taking advantage of its more subtle sensitivities. The new hybrid parameterization is optimized in the same multi-well dataset as above. FIGS. 11A and 11B compare the original and modified parameterizations for the iron ratio with respect to the formation Sigma measured by the spectroscopic logging-while-drilling tool. The small spread in $Fe^{tool}/TB$ at each Sigma value is caused by the other environmental dependences derived from pure modeling.

Figure 12:
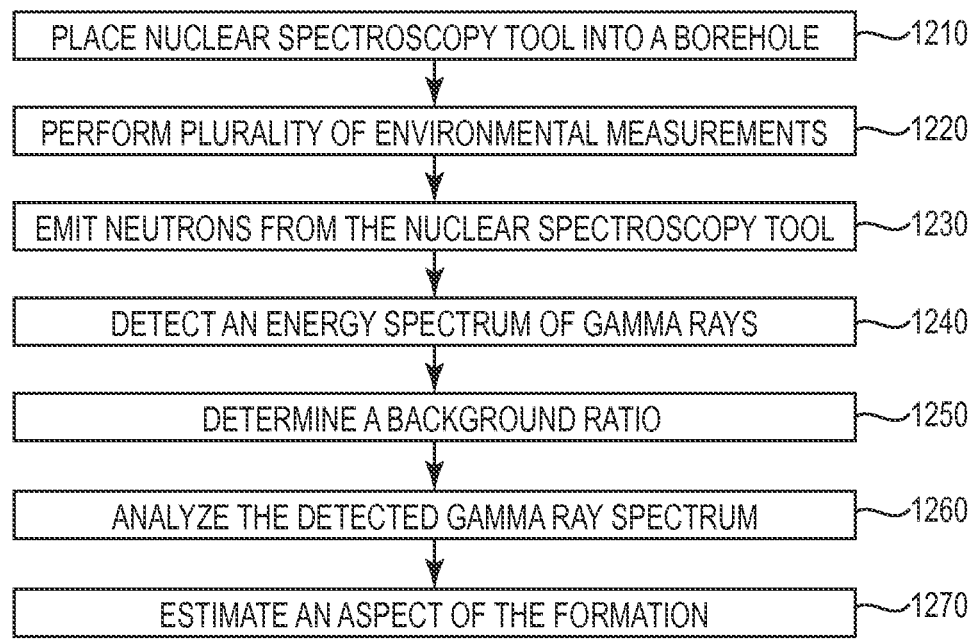
FIG. 12 is a flowchart illustrating a method in accordance with an embodiment of the disclosure.

FIG. 12 is a flow diagram illustrating a method for determining or estimating an aspect of a formation using a nuclear spectroscopy tool such as that described above with respect to FIGS. 1-4. As generally indicated at block 1210, the nuclear spectroscopy tool can be placed into a borehole. A plurality of environmental measurements can be performed using the nuclear spectroscopy tool or other equipment, as indicated at block 1220. Illustrative but non-limiting examples of environmental measurements include one or more of a borehole size, a rock formation density, a borehole fluid density, a hydrogen index of the rock formation, a neutron slowing-down length of the formation, a thermal neutron capture cross section of the formation, or a thermal neutron capture cross section of a borehole fluid.

As shown at block 1230, neutrons can be emitted from the nuclear spectroscopy tool such that some of the neutrons generate gamma rays from a formation adjacent the nuclear spectroscopy tool and some of the neutrons generate gamma rays from elements within the nuclear spectroscopy tool. In some embodiments, the neutron source can be an electronic neutron generator such as a pulsed electronic neutron generator or a chemical source such as AmBe. In some embodiments, the neutrons can interact with an element of the formation or of the tool in an inelastic or radiative capture interaction. The elements within the tool can form part of the tool, or can be found within materials flowing in and through the tool.

As indicated at block 1240, an energy spectrum of gamma rays that were induced by the emitted neutrons can be detected. In some instances, the energy spectrum can include a background having a plurality of measured spectral components. A background ratio between at least one spectral component of the background and another measured spectral component can be determined or estimated in accordance with the plurality of environmental measurements, as generally shown at block 1250. In some embodiments, determining or estimating a background ratio includes determining or estimating a ratio between an iron yield from iron within the nuclear spectroscopy tool and a total iron back tool background yield as a function of one or more of the measured environmental parameters. In some embodiments, an algorithm for estimating the background ratio is based on Monte Carlo modeling, prior experimental measurements or a combination of Monte Carlo modeling and prior experimental measurements. The detected gamma ray spectrum can be analyzed using a combination of standard spectra and by subtracting at least one spectral component of the background in accordance with the background ratio as shown at block 1260.

In some embodiments, the background spectral component being subtracted includes gamma rays from an element such as calcium or iron in a cement annulus, a casing, or a tubing of a well. In some embodiments, the background spectral component being subtracted includes gamma rays emanating from iron within the nuclear spectroscopy tool. The tool background iron spectrum can have a certain estimated ratio with respect to other spectral components of the tool background. In some embodiments, other components of the tool background can include one or more of Cr, Ni, Mn, W, Mo, Co and elements within a crystal of the gamma ray detector. In some embodiments, the spectral background component being subtracted has a certain estimated background ratio relative to a total formation rock component. For example, the background iron and calcium from the steel casing and cement annulus can be subtracted from spectroscopy measurement as a ratio with respect to the total formation elements.

In some embodiments, analyzing the detected gamma ray spectrum includes using the measured environmental parameters to determine or estimate what portion of the energy spectrum is a result of the element within the nuclear spectroscopy tool and subtracting that portion of the energy spectrum to determine or estimate the portion of the energy spectrum resulting from the element within the rock formation.

In some embodiments, and as indicated at block 1270, an aspect of the formation can be determined or estimated based on the analysis performed at block 1260. For example, the fractional amount of clay can be determined or estimated from the elemental fractions using an elements-to-minerals inversion. Since most clay minerals contain iron, the accuracy of this inversion is highly dependent on the accuracy of the elemental iron fraction.

Two or More Standards Using Different Spatial Regions

In some embodiments, the tool background can be split into multiple, that is, two or more standard spectra or portions to account for the tool contribution, depending on different locations of neutron interaction. One example of this embodiment depends on whether the tool-captured neutron thermalized inside the flow tube or around the outer parts of the tool. These different spectra can be obtained from measurements or via Monte Carlo modeling. In some embodiments, the ratio of the contributions from these spectra can be constrained based on environmental dependencies including borehole size, formation density, borehole fluid density, porosity, hydrogen index of the formation, neutron slowing-down length of the formation, thermal neutron capture cross section of the formation, or thermal neutron capture cross section of the borehole fluid. This method of dividing a single standard spectrum into multiple standards based on spatial region can be applied to a combined standard whose elemental composition changes due to the environment (such as the example of tool background). One specific embodiment could involve the use of two different spectra to limit the number of variables or degrees of freedom and any corresponding inaccuracy.

Because neutrons can thermalize both inside the flow tube (or channel) as well as around the outside of the tool, in a proportion that depends upon environmental conditions, the gamma-rays coming from the tool parts are not fully or most accurately accounted for by a single spectral shape, as has been the custom. The spatial distribution of the thermal neutron population is affected by many environmental factors, including but not limited to borehole size, formation density, borehole fluid density, porosity, hydrogen index of the formation, neutron slowing-down length of the formation, thermal neutron capture cross section of the formation, or thermal neutron capture cross section of the borehole fluid. For an environment that creates a greater proportion of thermal neutrons in the interior of the tool, the resulting true spectrum of the tool background will look more like the materials of the inner tool parts. An environment that thermalizes a relatively greater fraction of neutrons outside the tool will produce background that samples the external tool parts more heavily.

In some embodiments, the tool can have a lack of homogeneity largely in a radial direction. In some embodiments, the tool can have an azimuthal and/or axial lack of homogeneity. For example, there can be differences in composition along an axis of the tool away from the neutron source and the neutron transport can be different inside a flow channel and outside of the tool. As a result, the relative contributions of neutrons thermalizing in the mud channel and the outside of the tool sample different areas of the length of the tool. An illustrative but non-limiting example of this is a scintillator crystal that can have an incompletely shielded neutron cross section and is only present at a well-defined distance from the neutron source.

In some embodiments, analyzing a measured spectrum with a single constant "tool background" standard can cause difficulties because any single standard does not always reflect the true spectral shape of the tool background, causing biases in the other elemental yields, and a correction for the background iron, believed to be a ratio of this other background, can be inaccurate. To account for the mix of materials in the tool background, one could include a standard spectrum for each element found in the tool materials, which can include one or more of Cr, Ni, Mn, Fe, Mo, Co, W, and the detector crystal itself However, including so many extra degrees of freedom in the analysis can result in unacceptable statistical uncertainty.

In some embodiments, two standard spectra can be included to account for the tool background, one primarily containing gamma-rays from neutrons that thermalized inside the tool, primarily inside the flow tube, and the other from neutrons thermalized around the outer parts of the tool. In some embodiments, the total tool background can be a linear combination of these two spectra. To illustrate, measurements were undertaken with an enriched $^{10}B$ wrap around the outside of the tool to suppress the external tool background and thus measure the "inner" component, and borax-loaded mud in the flow tube (with no external shielding) to extract the "outer" component of the tool background.

Figure 13:
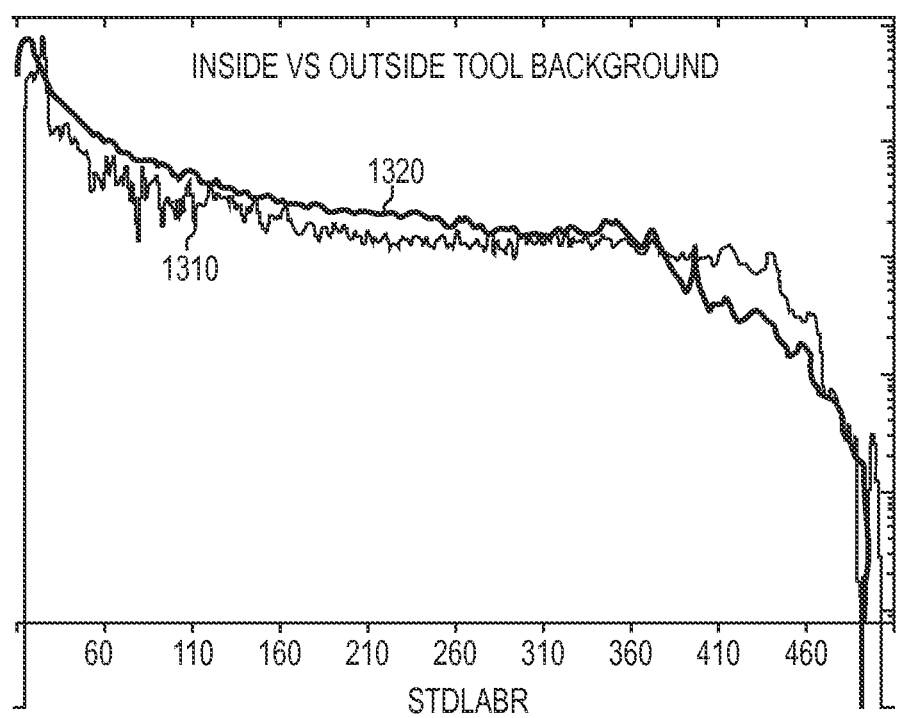
FIG. 13 is a plot illustrating experimentally derived examples of an inside tool background spectrum and an outside tool background spectrum.

FIG. 13 compares the two resulting spectra, which exhibit different elemental compositions based on which parts of the tool were being sampled. In FIG. 13, the spectrum 1310 represents an inner background standard while spectrum 1320 represents an outer background standard. As a proof of principle, it was verified that the total tool background for three different porosities (0, 15, and 100 p.u.) could be accurately matched with varying combinations of these two shapes. Moreover, the ratio of inner-to-outer background standards useful for this match showed a systematic dependence on porosity, suggesting that there can be a use for more than a single tool standard and also suggesting that the ratio might be predictable from other measured parameters such as borehole size, rock formation density, borehole fluid density, hydrogen index of the rock formation, neutron slowing-down length of the formation, thermal neutron capture cross section of the formation, or thermal neutron capture cross section of a borehole fluid.

Figure 14:
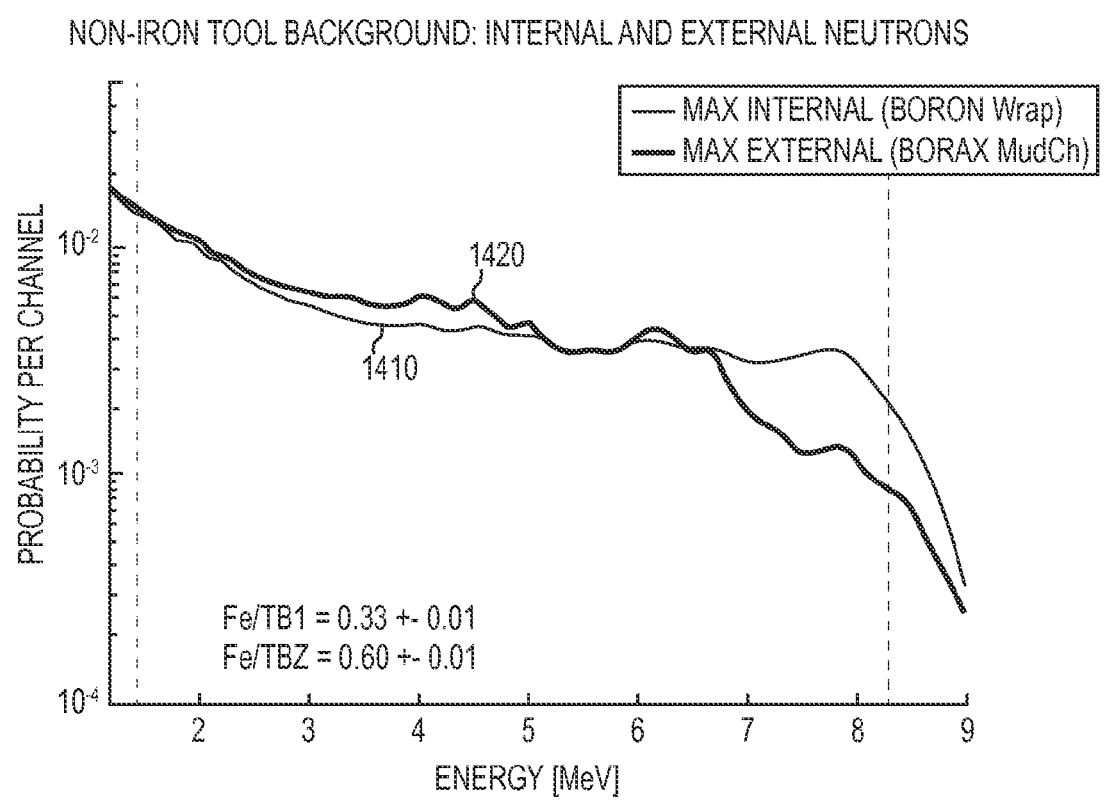
FIG. 14 is a plot illustrating inner and outer tool background spectra derived by modeling.

Multiple background standards can also be extracted and studied via Monte Carlo modeling that replicates the experimental setup described above. FIG. 14 shows an inner tool background spectrum 1410 and an outer tool background spectrum 1420. Just as in the experimental measurements, the two hypothetical standards are distinct from one another. The inner standard 1410 emphasizes the high-energy peaks that are characteristic of the flow tube material, while the 6-7 MeV peaks of the manganese in the collar are prominent in the outer spectrum 1420. These modeling results are completely consistent with initial experimental studies.

In some embodiments, using two standards offers the advantage of at least partially accounting for environmental effects which determine how the tool background is sampled. The resulting analysis will use a total background shape that is more representative of the true tool background, which will reduce the potential for biases in extraction of the background fraction and the other signal yields.

A second advantage will come from a more accurate correction for the iron in the tool background, which is a useful step for producing accurate clay estimates. Iron can exist in both the tool and the formation, and the combined iron contribution can be analyzed with a single iron standard (which is separate from the non-iron "tool background" discussed above). To arrive at the measurement of formation iron, the large contribution of the tool iron can be subtracted from the total iron. The customary method of iron subtraction assumes a fixed ratio of tool iron with respect to the other background elements. If the other tool background yield is biased, it translates directly into a bias on the formation iron yield. Moreover, just as the elemental mixtures within the two new proposed standards are quite different, so too is there a difference in iron ratios with respect to them. As shown in FIG. 14, Monte Carlo modeling predicts Fe/TB ratios of 0.33 and 0.60 for the mix of tool materials represented by the inner and outer tool background standards, respectively, compared to an experimentally measured value of 0.55 for the overall tool background. This indicates that using two standards for the iron correction can be more accurate.

This embodiment applies to thermal neutron capture spectroscopy with an LWD tool, but the method could also be applied to gamma-rays from inelastic neutron interactions and also for wireline tools. Inelastic measurements tend to have less severe environmental dependences, but they still exist, for example for density and porosity. Wireline spectroscopy tools have been more homogenous in their material composition than have been some logging-while-drilling designs for spectroscopy tools, so their environmental effects on tool background are less. Without a flow tube and mud channel, neutrons are thermalized primarily on the exterior of wireline tools. Nevertheless, one can envision scenarios in which multiple tool background standards based on spatial regions could be useful for wireline tools as well.

Figure 15:
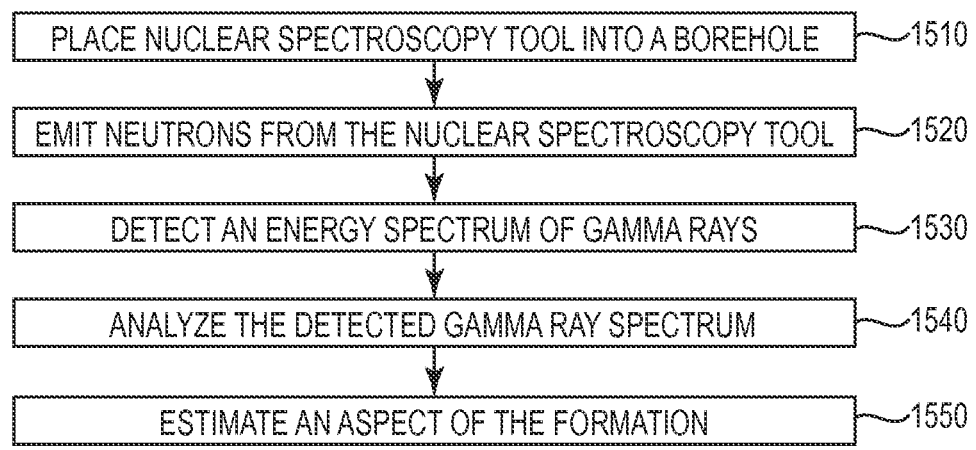
FIG. 15 is a flowchart illustrating a method in accordance with an embodiment of the disclosure.

FIG. 15 is a flowchart illustrating a method for determining an aspect of a formation using a nuclear spectroscopy tool. In some embodiments, the nuclear spectroscopy tool can include a spatial heterogeneity in its material composition. In some embodiments, the nuclear spectroscopy tool can be a wireline tool having a bow spring extending along the wireline tool or a logging-while-drilling tool that is configured to accommodate passage of drilling mud.

As generally indicated at block 1510, the nuclear spectroscopy tool can be placed into a borehole. As shown at block 1520, neutrons can be emitted from the nuclear spectroscopy tool such that some of the neutrons generate gamma rays from a formation adjacent the nuclear spectroscopy tool, some of the neutrons generate gamma rays from elements within the nuclear spectroscopy tool and some of the neutrons generate gamma rays from an element in the drilling mud. In some embodiments, the neutron source can be an electronic neutron generator such as a pulsed electronic neutron generator or a chemical source such as AmBe or Cf. In some embodiments, the neutrons can interact with an element of the formation or of the tool in an inelastic or radiative capture interaction. The elements within the tool can form part of the tool, or can be found within materials flowing in and through the tool.

As indicated at block 1530, an energy spectrum of gamma rays that were induced by the emitted neutrons can be detected. In some instances, the energy spectrum can include a background having a plurality of measured spectral components.

As generally indicated at block 1540, the detected gamma ray spectrum can be analyzed using a combination of standard spectra including at least two sub-standards that represent a common element or group of elements but that are differentiated based on where the neutrons thermalize. In some embodiments, the at least two sub-standards represent a combination of elements from a tool background or gamma ray spectrum resulting from neutrons thermalizing in spatially distinct portions of the nuclear spectroscopy tool. In some embodiments, each of the at least two sub-standards includes different combinations of at least two elements found within the nuclear spectroscopy tool. In some embodiments, each of the at least two sub-standards include different combinations of Fe, Cr, Ni, Mn, W, Co and Mo.

In some embodiments in which the nuclear spectroscopy tool is a logging-while-drilling tool, the at least two sub-standards represent, respectively, gamma rays that were generated by neutrons that thermalized within the nuclear spectroscopy tool and gamma rays that were generated by neutrons that thermalized outside of the nuclear spectroscopy tool. In some embodiments, the at least two sub-standards include a first sub-standard representing gamma rays generated by neutrons that thermalized within drilling mud inside a flow tube and a second sub-standard representing gamma rays generated by neutrons that thermalized in the surrounding borehole or rock formation.

In some embodiments, Monte Carlo modeling is used to create at least one of the stored standard spectra based on spatial region. In some embodiments, experimental measurements designed to isolate the gamma rays originating in various spatial regions are used to create at least one of the stored standard spectra.

In some embodiments, each of the at least two sub-standards represent a single element and are distinguished by region of origin in the rock formation, mud surrounding the nuclear spectroscopy tool, or mud within a flow channel inside the nuclear spectroscopy tool. In some embodiments, the single element is hydrogen, and the sub-standards separately represent hydrogen in the rock formation and hydrogen in the borehole mud. In some embodiments, the single element is chlorine, and the sub-standards separately represent chlorine in the rock formation and chlorine in the borehole mud.

In some embodiments, the distinguishing step includes comparing gamma ray attenuation represented by each of the at least two sub-standards. In some embodiments, the standard spectra include one average spectral standard and one or more "difference" standards that represent the difference between the average standard and the remaining plurality of sub-standards. In some embodiments, the standard spectra include one spectrum representing one of the extremes of the region of origin, or any linear combination of regions between an extreme and an average spectrum, and the remaining plurality of sub-standards represent differences with respect to this nominal standard. In some embodiments, the standard spectra are derived such that a linear combination thereof provides an approximation of an overall spectral shape for the single element.

In some embodiments, and as indicated at block 1550, an aspect of the formation can be estimated based on the analysis performed at block 1540. In some embodiments, estimating an aspect of the formation includes predicting a composition of the formation and making a drilling decision based on the predicted composition of the rock formation. In some embodiments, at least one of crude oil and natural gas are extracted after predicting the composition of the rock formation. For example, determining the clay content from the measured elemental concentrations can be used to estimate the permeability of the rock and thus to estimate the production rate of any oil that might be present.

Variable Shape Standard

In nuclear spectroscopy, elemental standard spectra are used to represent the characteristic gamma-ray energy spectrum of a single element or a composite group of elements in specific proportions. Examples of single-element standards include but are not limited to Fe, Cr, Ni, Mn, W, Mo and Co. A common example of a composite standard is the "tool background" standard, which combines elements that make up the tool in proportions that are believed to be meaningful. A traditional analysis has each single element or combined group of elements represented by a single standard spectrum whose shape is a fixed constant regardless of the downhole environment. If the environment in which the tool is immersed causes the true characteristic spectrum to have a different shape, the use of inaccurate standards can cause biases in the spectral analysis.

In some embodiments, it can be useful to maintain a single standard spectrum but modify the shape of the single standard spectrum based on other measurements of the downhole environment. The spectrum and its associated algorithms could be termed an "adaptive standard" or a "variable standard" to differentiate the spectrum from the assumption of a constant spectral shape. The understanding for predicting this variation in shape could be acquired through experimentation, for example by deriving the same standard at various porosities or formation and borehole salinities. The understanding could also be acquired through studies with Monte Carlo modeling and other modeling approaches.

The adaptive standard could be a composite standard such as the tool background, in which case the relative mixture of elements or materials being sampled by the neutrons in the tool can be predicted. The spectrum can also be adjusted to account for the distance over which the gamma-rays are scattered. The adaptive algorithm can incorporate information from measurements including but not limited to borehole size, formation density, borehole fluid density, porosity, hydrogen index of the formation, neutron slowing-down length of the formation, thermal neutron capture cross section of the formation, or thermal neutron capture cross section of the borehole fluid. The adaptive variation can include but is not limited to operations applying a transform that smears or shifts the spectrum, adjustments to the height and width of certain peaks, or variation of the relative fraction of fixed shapes describing Compton scattering (in which a gamma ray collides with an electron and transfers some of its energy to the electron) or of any elemental sub-components. These adaptations can be performed downhole in real-time or they could be applied in post-processing.

In some embodiments, the variable standard can also be a single-element standard that can be subject to environmental effects. Examples of particular interest would be the Compton scattering and attenuation effects on gamma rays from hydrogen and chlorine, which are elements that frequently exist in both the borehole and in the formation. The nuclei in the borehole are located closer to the detector, on average, than the nuclei of the same element in the formation. As a result, gamma rays from formation elements that arrive at the detector tend to be attenuated and scattered over a longer distance and through a denser medium than gamma rays from the same elements in the borehole alone. The overall spectrum observed for each element can be a mixture of different characteristic spectra associated with each spatial region. While these effects are of interest for hydrogen and chlorine, the problem is applicable to any element that inhabits multiple spatial regions. In some embodiments, one solution is to use separate standards for the formation and borehole components (or any other plurality of standards based on spatial region) for the element of interest. Another solution is to use one single standard for each element whose shape could be varied to account for environmental effects. Adjustments based on Compton down-scattering (meaning gamma rays lose a portion of their energy in a Compton event) and the relative height and width of certain peaks are of particular interest for this application, but other variation is possible. The adjustments could be made based on similar environmental measurements as described above. This method is applicable to the standard spectra for any element, including but not limited to H, Cl, S, Ba, Ca, Si, and Fe.

In some embodiments, a variable standard will provide a shape that is more representative of the true shape of the spectral component that it is intended to describe in a given environment. This reduces the potential for biases for all elements in the spectral fitting routine. The method also provides benefits in statistical precision, because the use of a single standard (i.e. not introducing additional standards) can minimize the number of degrees of freedom in the fit.

The method of variable standard shapes is applicable to gamma-rays from any neutron energy regime, including thermal neutron capture and inelastic neutron collisions. The method is applicable to any nuclear spectroscopy tool, including wireline and logging-while-drilling implementations.

As noted above, the method of dividing a single standard into multiple component standards has another application, which pertains to when multiple standards represent the same single element for different spatial regions. This approach is again driven by environmental effects, but from a different perspective. Whereas before the environment caused a different mixture of elements in a spectrum whose shape was believed to be constant, here the environment more simply affects the distance over which the gamma-rays from a single element are attenuated. In other words, the previous method focused on the effects of variations on populating the different locations the detector is sensitive to with neutrons from the source, whereas the latter method is largely concerned with accounting for the impact on the spectrum due to the different geometries of the nuclear interaction sites relative to the detector position. The first is more affected by neutron transport and the later more by gamma-ray transport.

An example is that of gamma rays from neutron capture by hydrogen in the borehole versus hydrogen in the formation. Hydrogen in the borehole is located closer to the detector, on average, than hydrogen in the formation. Therefore gamma-rays from formation hydrogen which arrive at the detector are attenuated and scattered over a longer distance and through a denser medium than the borehole alone. The characteristic gamma-ray energy spectra associated with hydrogen for these two different spatial regions can be extracted from experimental measurements or from Monte Carlo modeling.

Figure 16:
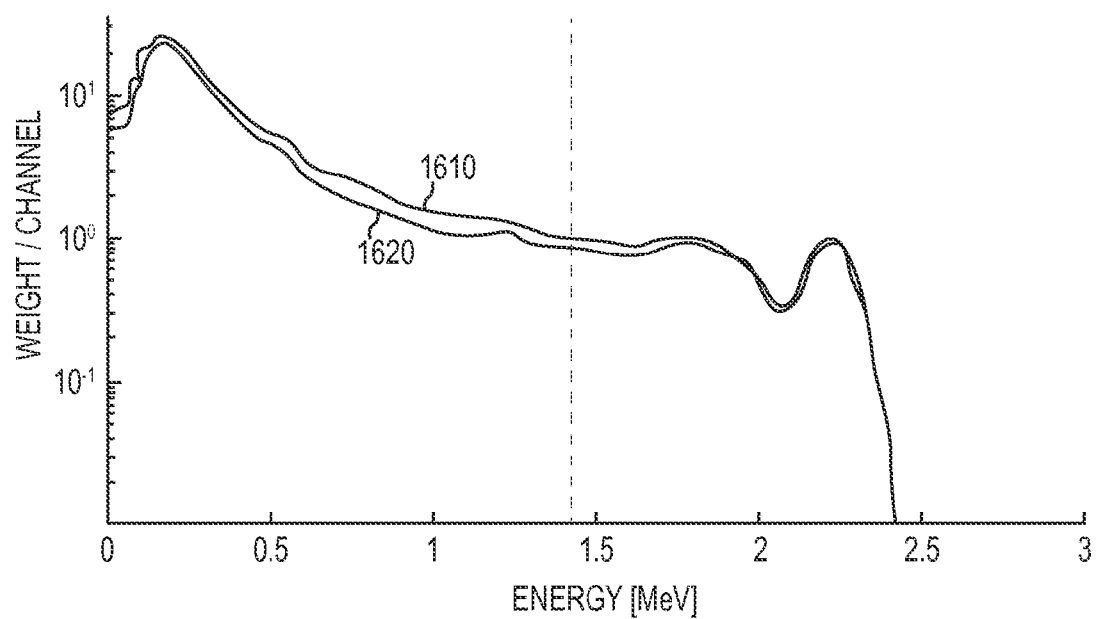
FIG. 16 is a plot illustrating modeled spectra from gamma rays originating in a formation and from gamma rays originating in a borehole or mud channel.
Figure 17:
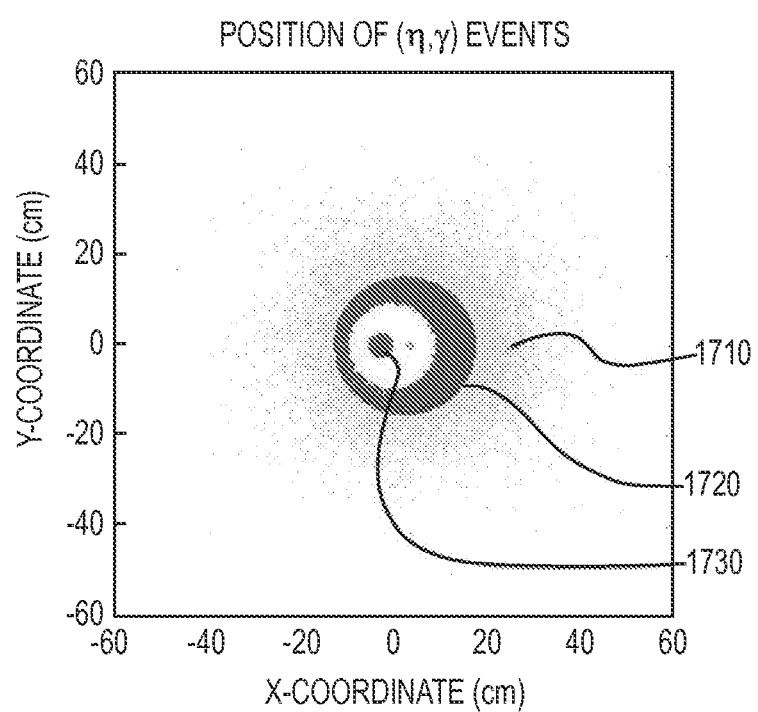
FIG. 17 is a plot illustrating Monte Carlo modeling of spatial distribution of neutron captures.

FIG. 16 shows modeled spectral standards for hydrogen from these two regions, again using a spectroscopic logging-while-drilling tool, and FIG. 17 plots the spatial origin of the two spectra. In FIG. 16, the modeled spectrum for hydrogen in the formation is labeled as spectrum 1610 while the modeled spectrum for hydrogen in the borehole and mud channel is labeled as spectrum 1620. In FIG. 17, the modeled neutron capture from hydrogen in the formation is labeled as region 1710 while the modeled neutron captures from hydrogen in the borehole and mud channel are labeled as regions 1720 and 1730, respectively. The standard for formation H has more weight in the lower channels due to the loss of gamma-ray energy from scattering through a larger distance and through denser materials on average. In this example, the "borehole" standard includes both the borehole around the outside of the tool as well as the mud channel. For logging-while-drilling tools, it would also be possible to derive a third hydrogen standard by separating the mud channel contribution from that of the external borehole.

In some embodiments, enhanced spectroscopy analysis would use at least these two standards instead of only one for hydrogen. Measurements in a smaller borehole or in a salty borehole would see less yield from borehole hydrogen, and measurements in a less porous formation would see less yield from formation H. Environmental effects like these cause the overall shape of the detected hydrogen spectrum to vary. Whereas the customary single-standard analysis tries to impose a constant shape on all the hydrogen—with the risk that biases will be propagated to all the spectral yields, not hydrogen alone—the dual-standard analysis at least partially accounts for these environmental effects by allowing components of the H spectrum to be mixed in a meaningful way.

An equivalent implementation of this dual-region method uses one standard that describes an average total spectrum of H, including both the formation and borehole, and a second standard that describes the difference between the formation and borehole spectra. The varying sum of the two standards again provides a total spectrum which accounts for environmental effects. In some embodiments, other linear combinations of two such tool standards can be mathematically equivalent and can be used.

This example has discussed the specific case of hydrogen, but the method can also improve the accuracy of measuring other elements which appear in both the formation and the borehole, most notably chlorine. The elements which can see improved measurements from this method include but are not limited to hydrogen, chlorine, sulfur, barium, calcium, silicon, and iron. Additionally, the spatial zones of interest are not restricted only to the formation and borehole. This technique applies generally to any single-element standard which can be divided into multiple components based on any spatial region, using experimental measurements or Monte Carlo modeling or other modeling approaches.

Figure 18:
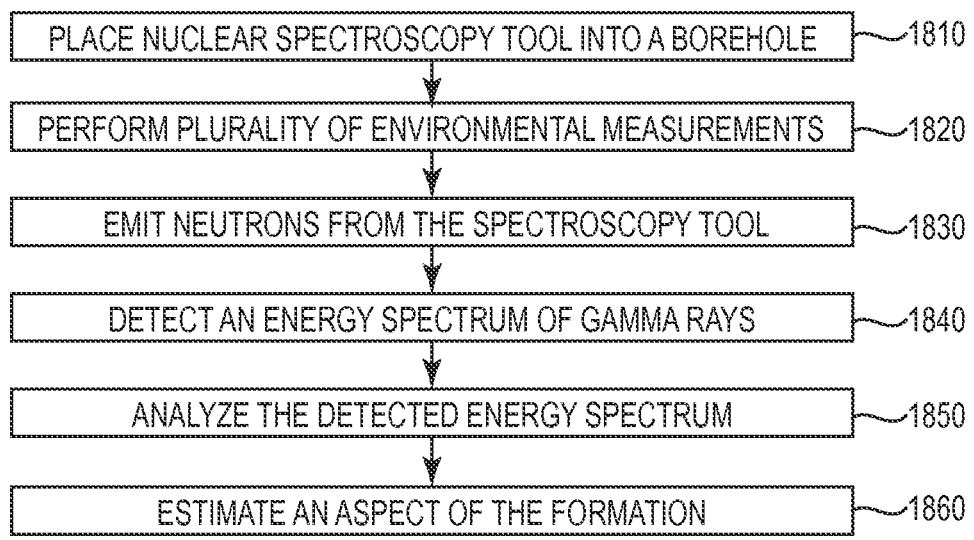
FIG. 18 is a flowchart illustrating a method in accordance with an embodiment of the disclosure.

FIG. 18 is a flowchart illustrating a method for determining an aspect of a formation using a nuclear spectroscopy tool. As generally indicated at block 1810, the nuclear spectroscopy tool can be placed into a borehole. In some embodiments, the nuclear spectroscopy tool can include a spatial heterogeneity in its material composition. In some embodiments, the nuclear spectroscopy tool can be a wireline tool having a bow spring extending through or along the wireline tool or a logging-while-drilling tool that is configured to accommodate passage of drilling mud.

A plurality of environmental measurements can be performed using the nuclear spectroscopy tool or other equipment, as indicated at block 1820. Illustrative but non-limiting examples of environmental measurements include one or more of borehole size, formation density, borehole fluid density, porosity, hydrogen index of the formation, neutron slowing-down length of the formation, thermal neutron capture cross section of the formation, or thermal neutron capture cross section of the borehole fluid.

As shown at block 1830, neutrons can be emitted from the nuclear spectroscopy tool such that some of the neutrons generate gamma rays from a formation adjacent the nuclear spectroscopy tool, some of the neutrons generate gamma rays from elements within the nuclear spectroscopy tool and some of the neutrons generate gamma rays from an element in the drilling mud. In some embodiments, the neutron source can be an electronic neutron generator such as a pulsed electronic neutron generator or a chemical source such as AmBe or Cf. In some embodiments, the neutrons can interact with an element of the formation or of the tool in an inelastic or radiative capture interaction. The elements within the tool can form part of the tool, or can be found within materials flowing in and through the tool. An energy spectrum of gamma rays induced by the emitted neutrons is detected with the tool, as generally indicated at block 1840.

As indicated at block 1850, the detected gamma ray spectrum can be analyzed using a combination of standard spectra, where the shape of at least one of the standard spectra is varied based on the environmental measurements to account for the environment's effects on gamma-ray spectra. In some embodiments, the standard with variable shape represents a single element such as hydrogen or chlorine. In some embodiments, the environmental effect that is being accounted for is gamma-ray attenuation, as driven by the relative mixture of gamma rays emitted from the rock formation versus gamma rays emitted from a borehole fluid.

In some embodiments, the standard with variable shape represents a collection of elements in a tool background, such as one or more of Fe, Cr, Ni, Mn, W, Mo and Co. In some embodiments, the collection of elements in the tool background includes elements within a crystal of the gamma ray detector. In some embodiments, a variable shape of a tool background standard accounts for changes in the relative mixture of elements that form the tool background, as driven by the spatial distribution of neutrons that are created in a given environment. In some embodiments, the shape and variation of at least one standard spectrum is derived from Monte Carlo modeling, experimental measurements or a combination of Monte Carlo and experimental measurements.

In some embodiments, and as indicated at block 1860, an aspect of the formation can be estimated based on the analysis performed at block 1850. In some embodiments, estimating an aspect of the formation includes predicting a composition of the formation and making a drilling decision based on the predicted composition of the rock formation. In some embodiments, at least one of crude oil and natural gas can be extracted after predicting the composition of the rock formation.

Various modifications, additions and combinations can be made to the exemplary embodiments and their various features discussed without departing from the scope of the present invention. For example, while the embodiments described above refer to particular features, the scope of this invention also includes embodiments having different combinations of features and embodiments that do not include all of the above described features.

What is claimed is:

1. A method for estimating an aspect of a formation using a nuclear spectroscopy tool, comprising:
   placing a nuclear spectroscopy tool including a neutron source and a gamma ray detector into a borehole;
   performing a plurality of environmental measurements;
   emitting neutrons from the nuclear spectroscopy tool such that some of the neutrons can generate gamma rays from a formation adjacent the nuclear spectroscopy tool and some of the neutrons can generate gamma rays from elements within the nuclear spectroscopy tool;
   detecting an energy spectrum of gamma rays induced by the emitted neutrons, the energy spectrum including a tool background comprising the gamma rays from elements within the nuclear spectroscopy tool having a plurality of measured spectral components including an iron spectral component;
   estimating a background ratio between the iron spectral component of the tool background and at least one other spectral component of the tool background in accordance with the plurality of environmental measurements;

analyzing the detected gamma ray spectrum using a combination of standard spectra and subtracting the iron spectral component of the tool background in accordance with the background ratio; and estimating an aspect of the formation based on the analyzed spectrum.

2. The method of claim 1, wherein the neutron source comprises an electronic neutron generator or a chemical source.

3. The method of claim 2, wherein the neutron source comprises a pulsed electronic neutron generator.

4. The method of claim 2, wherein the neutron source comprises AmBe or Cf.

5. The method of claim 1, wherein a neutron interacts with an element of the formation or an element of the tool in an inelastic or radiative capture interaction.

6. The method of claim 1, where the plurality of environmental measurements include measurements of at least one of borehole size, formation density, borehole fluid density, hydrogen index of the formation, neutron slowing-down length of the formation, a thermal neutron capture cross section of the formation, and a thermal neutron capture cross section of the borehole fluid.

7. The method of claim 1, wherein the at least one other component of the tool background includes one or more of Cr, Ni, Mn, W, Mo, Co and elements within a crystal of the gamma ray detector.

8. The method of claim 1, wherein an algorithm for estimating the background ratio is based on Monte Carlo modeling.

9. The method of claim 1, wherein an algorithm for estimating the background ratio is based on prior experimental measurements.

10. The method of claim 1, wherein an algorithm for estimating the background ratio is based on a combination of Monte Carlo modeling and prior experimental measurements.

11. The method of claim 1, wherein analyzing the detected gamma ray spectrum comprises using the measured environmental parameters to determine or estimate what portion of the energy spectrum is a result of the element within the nuclear spectroscopy tool and subtracting that portion of the energy spectrum to determine or estimate the portion of the energy spectrum resulting from the element within the formation.

12. The method of claim 1, wherein estimating a background ratio comprises estimating a ratio between an iron yield from iron within the nuclear spectroscopy tool and a total non-iron background yield as a function of one or more of the measured environmental parameters.

13. A nuclear spectroscopy tool for estimating an aspect of a formation, comprising:

a neutron source configured to emit neutrons such that some of the neutrons can generate gamma rays from a formation adjacent the nuclear spectroscopy tool and some of the neutrons can generate gamma rays from elements within the nuclear spectroscopy tool;

a gamma ray detector configured to detect an energy spectrum of gamma rays induced by the emitted neutrons, the energy spectrum including a tool background comprising gamma rays from elements within the nuclear spectroscopy tool, having a plurality of spectral components; including an iron spectral component; and data processing circuitry that estimates a background ratio between the iron spectral components of the tool background at least one other spectral component of the tool background in accordance with measurements made of the environment of the tool and the formation, analyzes the detected gamma ray spectrum using a combination of standard spectra and by subtracting the iron spectral component of the tool background in accordance with the background ratio, and estimates an aspect of the formation based on the analyzing of the detected gamma ray spectrum.

14. The system of claim 13, comprising a measurement device for performing measurements of the environment of the system and the formation.

15. The system of claim 14, wherein the measurement device comprises at least one of a bore hole caliper, nuclear spectroscopy density tool, radioisotope neutron source, electronic neutron generator, neutron detector, gamma-ray detector, thermal detector, epithermal detector, neutron monitor; and wherein the data processing circuitry comprises a processor, algorithms, and data storage.

* * * * *